(12) United States Patent
Chen

(10) Patent No.: US 8,089,255 B2
(45) Date of Patent: Jan. 3, 2012

(54) POWER FACTOR CORRECTION POWER SUPPLY UNIT, AND CONTROL CIRCUIT AND CONTROL METHOD USED IN THE SAME

(75) Inventor: Jian Chen, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 358 days.

(21) Appl. No.: 12/461,979

(22) Filed: Aug. 31, 2009

(65) Prior Publication Data

US 2010/0109626 A1    May 6, 2010

(30) Foreign Application Priority Data

Sep. 29, 2008 (JP) ................................. 2008-249791
May 20, 2009 (JP) ................................. 2009-122540

(51) Int. Cl.
*G05F 1/00* (2006.01)
(52) U.S. Cl. ........................ 323/282; 323/271
(58) Field of Classification Search .................. 323/222, 323/271, 282
See application file for complete search history.

(56) References Cited

U.S. PATENT DOCUMENTS

| | | | |
|---|---|---|---|
| 6,657,877 B2 | 12/2003 | Kashima et al. | |
| 6,946,819 B2 * | 9/2005 | Fagnani et al. | 323/207 |
| 7,279,876 B2 * | 10/2007 | Adragna et al. | 323/284 |
| 7,315,151 B2 * | 1/2008 | Thompson et al. | 323/223 |
| 7,352,599 B2 * | 4/2008 | Shimada | 363/79 |
| 7,391,631 B2 * | 6/2008 | Shimada | 363/89 |
| 7,936,152 B2 * | 5/2011 | Shimizu | 323/222 |

FOREIGN PATENT DOCUMENTS

| | | |
|---|---|---|
| JP | 2000-324809 A | 11/2000 |
| JP | 2006-296158 A | 10/2006 |

* cited by examiner

*Primary Examiner* — Adolf Berhane
*Assistant Examiner* — Emily Pham
(74) *Attorney, Agent, or Firm* — Manabu Kanesaka

(57) ABSTRACT

A power factor correction power supply unit for correcting a power factor includes a switching device, an input voltage detection circuit, an output voltage detection circuit, an error amplifier for outputting an error signal obtained by amplifying a difference between an output voltage detection signal and a reference voltage, an ON width generation circuit for generating an ON time width, an OFF width generation circuit for generating an OFF time width of the switching device, and a switching device driving circuit. The drive circuit conducts an ON/OFF control over the switching device upon receiving a turn-on timing signal for turning on the switching device as soon as the OFF time width is terminated and upon receiving a turn-off timing signal for turning off the switching device as soon as the ON time width is terminated.

14 Claims, 17 Drawing Sheets

POWER FACTOR CORRECTION POWER SUPPLY UNIT, AND CONTROL CIRCUIT AND CONTROL METHOD USED IN THE SAME

BACKGROUND OF THE INVENTION AND RELATED ART STATEMENT

The present invention relates to a PFC (Power Factor Correction) power supply unit, and a control circuit and a control method used in the same. The present invention particularly relates to a switching power supply unit which converts an AC input from an AC power supply into a DC output with a high power factor.

As known well, AC power includes active power, reactive power and apparent power. Only power which can be converted in AC/DC conversion is the active power. Therefore, it can convert more power into DC as the power factor is higher (closer to 100%). For this reason, PFC (Power Factor Correction) is normally conducted when designing a switching power supply unit.

FIG. 11 is a diagram showing the configuration of a typical PFC converter. FIG. 11 shows the configuration of a PFC boost converter which controls a stable output voltage while creating an input current proportional to an input voltage by means of a booster circuit. In the boost converter shown in FIG. 11, the reference sign Vac designates an AC power supply; Vi, an input voltage obtained by cutting noise out of Vac by means of a filter and then performing full-wave rectification thereupon; L1, an inductor; Q1, a switching device; D1, a backflow prevention diode; Vo, an output voltage; Rload, a load; C1, an input-side smoothing capacitor; and C2, an output capacitor composed of an electrolytic capacitor. In this case, control systems for controlling the switching device Q1 can be classified into a discontinuous (current) system, a continuous (current) system and a critical system in accordance with a current following into the inductor L1. Here, the critical system is a system located in the border between the discontinuous (current) system and the continuous (current) system. The critical system is a system in which the switching device Q1 is changed over from OFF to ON as soon as the current flowing into the inductor L1 reaches zero.

As compared with the continuous (current) system, the critical system has a feature that the diode D1 has no reverse recovery current though the inductor L1 has a high peak current. The critical system is often applied to lower power supplies of 75 W to 350 W among power supplies with input power of 75 W or greater, to which PFC is obliged to be applied by regulations on higher harmonics.

As for a control method for achieving critical PFC, there have been heretofore known two methods for detecting a critical point (which is the timing when inductor discharge is completed, that is, a timing when an inductor current reaches zero). One is a system (drain voltage detection system) which uses an auxiliary winding to detect a drain voltage. The other is a system (minus current detection system) which uses a resistor to detect a minus current.

FIG. 12 shows a conventional type critical PFC converter 2 with a drain voltage detection system. The critical PFC converter 2 has a zero current detection circuit 4, an error amplifier 5 and an ON time generator 6. The zero current detection circuit 4 monitors a voltage obtained from an auxiliary wiring L2 and detects a zero current. The zero current detection circuit 4 informs the ON time generator 6 of the detection of the zero current. Further, the zero current detection circuit 4 generates a (switch) ON signal at the timing when the zero current is detected, and supplies the ON signal to a driving circuit 7. The error amplifier 5 amplifies a difference between a voltage obtained by dividing an output voltage Vo by resistors R11, R12 and a reference voltage Vref, and outputs the amplified difference as an error signal Comp.

The ON time generator 6 generates an ON width (time width in which a switching device Q1 is ON) from a zero current detection signal of the zero current detection circuit 4 and the error signal Comp of the error amplifier 5. The ON time generator 6 generates a turn-off timing from the generated ON width and outputs a (switch) OFF signal at the generated timing. The (switch) ON signal outputted from the zero current detection circuit 4 and the (switch) OFF signal outputted from the ON time generator 6 are supplied to the driving circuit 7. Based on the (switch) ON signal and the (switch) OFF signal, the driving circuit 7 controls a gate of the switching device Q1 so as to achieve a critical control operation. In the circuit configuration shown in FIG. 12, the configuration of a preliminary stage which should be located preliminary to an input voltage Vi as shown in FIG. 11 is not shown. Examples of such power supply circuits for detecting a zero cross using an auxiliary winding are shown in Patent Document 1 (Japanese Unexamined Patent Application Publication No. JP-A-2006-296158) and Patent Document 2 (Japanese Unexamined Patent Application Publication No. JP-A-2002-176768).

On the other hand, a conventional critical PFC converter 3 with a minus current detection system shown in FIG. 13 has a zero current detection circuit 4'. The zero current detection circuit 4' is provided with a current detection resistor R13 for detecting a minus current flowing into an inductor L1. Based on the detected minus current, the zero current detection circuit 4' detects a zero current. The other configuration is the same as the configuration shown in FIG. 12, and description thereof will be therefore omitted. An example of such a power supply circuit for detecting a zero cross using a current detection resistor is shown in Patent Document 3 (Japanese Unexamined Patent Application Publication No. JP-A-2000-324809).

In the conventional circuit configuration with the drain voltage detection system shown in FIG. 12, the auxiliary winding L2 is required. Therefore, the configuration of the inductors L1, L2 is complicated. Further, short-circuit protection for the auxiliary winding L2 is also required to make it difficult to lower the cost of the PFC converter and reduce the profile thereof.

In the conventional circuit configuration with the minus current detection system shown in FIG. 13, the auxiliary winding in the circuit configuration shown in FIG. 12 is not required. However, the following problems have been pointed out.

(1) The converter works continuously under a high input voltage.
(2) Due to a low minus current detection level, the converter is so sensitive to noise from a current loop so that malfunction occurs easily.
(3) Power consumption increases due to the minus current detection resistor.
(4) It is difficult to establish a critical interleave.

Of the four problems, the problems (1) and (4) will be described specifically.

First, the mechanism of the problem (1) will be described. FIG. 14 shows a timing chart for the description (operation in FIG. 13). In the minus current detection system, a minus current IR is detected. As shown in FIG. 14, when the current IR reaches a threshold current value Ith or lower, the current IR is detected as a critical point. However, the threshold current value Ith is not zero through it is low. Therefore, a delay time Td is further required to turn on the switching device Q1 at a true critical point. The delay time Td depends on values of an input voltage Vi, an output voltage Vo, inductance, etc. Particularly the relationship between the delay time Td and the input voltage Vi (in FIG. 14) can be illustrated as shown in FIG. 15.

As shown in FIG. 15, the delay time increases along a J-curve as the input voltage Vi increases. For example, assume that the delay time Td is set at Td1 shown in FIG. 15 in (design of) the critical PFC converter. When the input voltage Vi is higher than a half of an output voltage Vo in this case, the delay time becomes insufficient. As a result, the switching device Q1 cannot be turned on at the true critical point, but performs continuous operation. This will be further described. A boost converter has a relationship that an output voltage Vo is higher than an input voltage Vi. Assuming that the inductance of an inductor is L, it is known that when the inductor current decreases, the inductor current decreases in a slope of (Vo−Vi)/L. Accordingly, as the input voltage Vi increases, the delay time Td increases as shown in FIG. 14. When the input voltage Vi is higher than the half of the output voltage Vo, the delay time becomes insufficient. As a result, the switching device Q1 cannot be turned on at the true critical point, but performs continuous operation.

Next, the problem (4) will be described by using a configuration in which the background-art minus current detection system has been applied to two-phase critical interleave. As shown in FIG. 16, a current flowing into a minus current detection resistor R corresponds to the sum IR(=IA+IB) of currents IA and IB flowing into inductors LA and LB respectively. As shown in the timing chart of FIG. 17 (explaining operation in FIG. 16), the current IR of the two-phase (0° and 180°) critical interleave is continuous. Therefore, the critical point cannot be detected by the current detection resistor R.

In consideration of the problems, a novel critical point detection system which is not a drain voltage detection system but can avoid the defects of the minus current detection system has been demanded as a critical point detection system to be applied to a PFC converter.

It is therefore an object of the invention to provide a power factor correction power supply unit in which a novel critical point detection system requiring no auxiliary winding as in a drain voltage detection system and having no disadvantages inherent to a minus current detection system is used for improved power factor correction.

It is another object of the invention to provide a control circuit and a control method for use in the power supply unit.

Further objects and advantages of the invention will be apparent from the following description of the invention.

SUMMARY OF THE INVENTION

According to the invention, a power factor correction power supply unit for correcting a power factor of a boost converter includes: a switching device; an input voltage detection circuit which detects magnitude of an input voltage and outputs an input voltage detection signal; an output voltage detection circuit which detects magnitude of an output voltage and outputs an output voltage detection signal; an error amplifier which outputs an error signal obtained by amplifying a difference between the output voltage detection signal and a reference voltage; an ON width generation circuit which generates an ON time width of the switching device determined by multiplying a difference between the error signal and a predetermined bias voltage by a predetermined coefficient; an OFF width generation circuit which generates an OFF time width of the switching device determined by dividing a product of the input voltage detection signal, the difference between the error signal and the predetermined bias voltage and the predetermined coefficient by a difference between the output voltage detection signal and the input voltage detection signal; and a switching device driving circuit which ON/OFF controls the switching device upon reception of a timing signal for turning on the switching device as soon as the OFF time width of the switching device generated by the OFF width generation circuit is terminated and upon reception of a timing signal for turning off the switching device as soon as the ON time width of the switching device generated by the ON width generation circuit is terminated.

In addition, according to the invention, the power factor correction power supply unit for correcting a power factor of a boost converter further includes: a capacitor which generates the timing signal for turning on the switching device and the timing signal for turning off the switching device; a capacitor charging circuit which charges the capacitor from the predetermined bias voltage to the error signal with a predetermined charging current so as to determine the ON time width of the switching device; and a capacitor discharging circuit which discharges the capacitor from the error signal to the predetermined bias voltage with a predetermined discharging current so as to determine the OFF time width of the switching device.

In addition, according to the invention, in the power factor correction power supply unit for correcting a power factor of a boost converter, the capacitor charging circuit includes a constant current source which controls the predetermined charging current, and a first switch circuit which applies the constant current source into a charging path of the capacitor. The capacitor discharging circuit includes a current source which controls the predetermined discharging current, and a second switch circuit which applies the current source into a discharging path of the capacitor. The predetermined charging current is set at, a fixed value by the constant current source, and the current source controls a value of the predetermined discharging current based on: predetermined discharging current=predetermined charging current×(output voltage detection signal−input voltage detection signal)/input voltage detection signal.

In addition, according to the invention, the predetermined coefficient is determined by a ratio between a capacitance value of the capacitor and the predetermined charging current used for charging the capacitor from the predetermined bias voltage to the error signal.

In addition, according to the invention, the power factor correction power supply unit for correcting a power factor of a boost converter further includes: a first comparison circuit which compares an end-to-end voltage of the capacitor with the error signal; and a second comparison circuit which compares the end-to-end voltage of the capacitor with the predetermined bias voltage, wherein the first comparison circuit outputs the turn-off timing signal as soon as the first comparison circuit detects that the end-to-end voltage of the capacitor has exceeded the error signal; and the second comparison circuit outputs the turn-on timing signal as soon as the second comparison circuit detects that the end-to-end voltage of the capacitor has dropped to the bias voltage or below.

In addition, according to the invention, in the power factor correction power supply unit for correcting a power factor of a boost converter, a delay circuit is added to an output side of the second comparison circuit, so as to delay, by a predetermined time, the turn-on timing signal outputted from the second comparison circuit, thereby delaying the turn-on timing signal.

Further, according to the invention, the power factor correction power supply unit for correcting a power factor of a boost converter further includes: a capacitor which generates the timing signal for turning on the switching device and the timing signal for turning off the switching device; a capacitor discharging circuit which discharges the capacitor from the predetermined bias voltage to the error signal with a predetermined discharging current so as to determine the ON time width of the switching device; and a capacitor charging circuit which charges the capacitor from the error signal to the predetermined bias voltage with a predetermined charging current so as to determine the OFF time width of the switching device.

In addition, according to the invention, the capacitor discharging circuit includes a constant current source which controls the predetermined discharging current, and a first switch circuit which applies the constant current source into a discharging path of the capacitor. The capacitor charging circuit includes a current source which controls the predetermined charging current, and a second switch circuit which applies the current source into a charging path of the capacitor. The predetermined discharging current is set at a fixed value by the constant current source, and the current source sets a value of the predetermined charging current as: predetermined charging current=predetermined discharging current×(output voltage detection signal−input voltage detection signal)/input voltage detection signal.

In addition, according to the invention, the predetermined coefficient is determined by a ratio between a capacitance value of the capacitor and the predetermined discharging current used for discharging the capacitor from the predetermined bias voltage to the error signal.

In addition, according to the invention, the power factor correction power supply unit for correcting a power factor of a boost converter further includes: a first comparison circuit which compares an end-to-end voltage of the capacitor with the error signal; and a second comparison circuit which compares the end-to-end voltage of the capacitor with the predetermined bias voltage. The first comparison circuit outputs the turn-off timing signal as soon as the first comparison circuit detects that the end-to-end voltage of the capacitor has dropped to the error signal or below, and the second comparison circuit outputs the turn-on timing signal as soon as the second comparison circuit detects that the end-to-end voltage of the capacitor has exceeded the bias voltage.

In addition, according to the invention, a delay circuit is added to an output side of the second comparison circuit, so as to delay, by a predetermined time, the turn-on timing signal outputted from the second comparison circuit, thereby delaying the turn-on timing.

In addition, according to the invention, a control circuit for use in a power factor correction power supply unit has inputs of an input voltage detection signal and an output voltage detection signal, the input voltage detection signal indicating magnitude of an input voltage to the power factor correction power supply unit, and the output voltage detection signal indicating magnitude of an output voltage of the power factor correction power supply unit. The control circuit comprises: an error amplifier which outputs an error signal obtained by amplifying a difference between the output voltage detection signal and a reference voltage; an ON width generation circuit which generates an ON time width of a switching device of the power factor correction power supply unit determined by multiplying a difference between the error signal and a predetermined bias voltage by a predetermined coefficient; an OFF width generation circuit which generates an OFF time width of the switching device determined by dividing a product of the input voltage detection signal, the difference between the error signal and the predetermined bias voltage and the predetermined coefficient by a difference between the output voltage detection signal and the input voltage detection signal; and a switching device driving circuit which ON/OFF controls the switching device upon receiving a timing signal for turning on the switching device as soon as the OFF time width of the switching device generated by the OFF width generation circuit is terminated, and upon receiving a timing signal for turning off the switching device as soon as the ON time width of the switching device generated by the ON width generation circuit is terminated.

In addition, according to the invention, the control circuit further includes a voltage detection circuit in which two resistors are connected in series between a to-be-detected voltage and a ground so as to obtain the to-be-detected voltage from a series connection point between the resistors when the input voltage detection signal or the output voltage detection signal is to be detected.

In addition, according to the invention, a control method for controlling ON/OFF time widths of a switching device to thereby improve a power factor of a power factor correction power supply unit includes the steps of: acquiring an input voltage detection signal and an output voltage detection signal as inputs, the input voltage detection signal indicating magnitude of an input voltage to the power factor correction power supply unit, and the output voltage detection signal indicating magnitude of an output voltage of the power factor correction power supply unit; outputting an error signal obtained by amplifying a difference between the output voltage detection signal and a reference voltage; generating an ON time width of a switching device of the power factor correction power supply unit determined by multiplying a difference between the error signal and a predetermined bias voltage by a predetermined coefficient; generating an OFF time width of the switching device determined by dividing a product of the input voltage detection signal, the difference between the error signal and the predetermined bias voltage, and the predetermined coefficient by a difference between the output voltage detection signal and the input voltage detection signal; and ON/OFF controlling the switching device upon receiving a timing signal for turning on the switching device as soon as the generated OFF time width of the switching device is terminated and upon receiving a timing signal for turning off the switching device as soon as the generated ON time width of the switching device is terminated.

According to the invention, it is possible to realize a critical PFC converter requiring no auxiliary winding as in a drain voltage detection system. It is therefore possible to simplify an inductor, and it is unnecessary to consider the trouble caused by short-circuiting of the auxiliary winding. Further, there are no defects inherent to a minus current detection system. It is therefore possible to obtain effects to prevent continuous operation, to prevent malfunction due to noise, to improve power efficiency, and so on. Further, it is also possible to design critical interleave requiring no auxiliary winding.

In addition, according to the invention, an ON delay is inserted so that it is possible to prevent from disturbing zero-current switching due to accumulated computing errors.

DETAILED DESCRIPTION OF PREFERRED EMBODIMENTS

Figure 1:
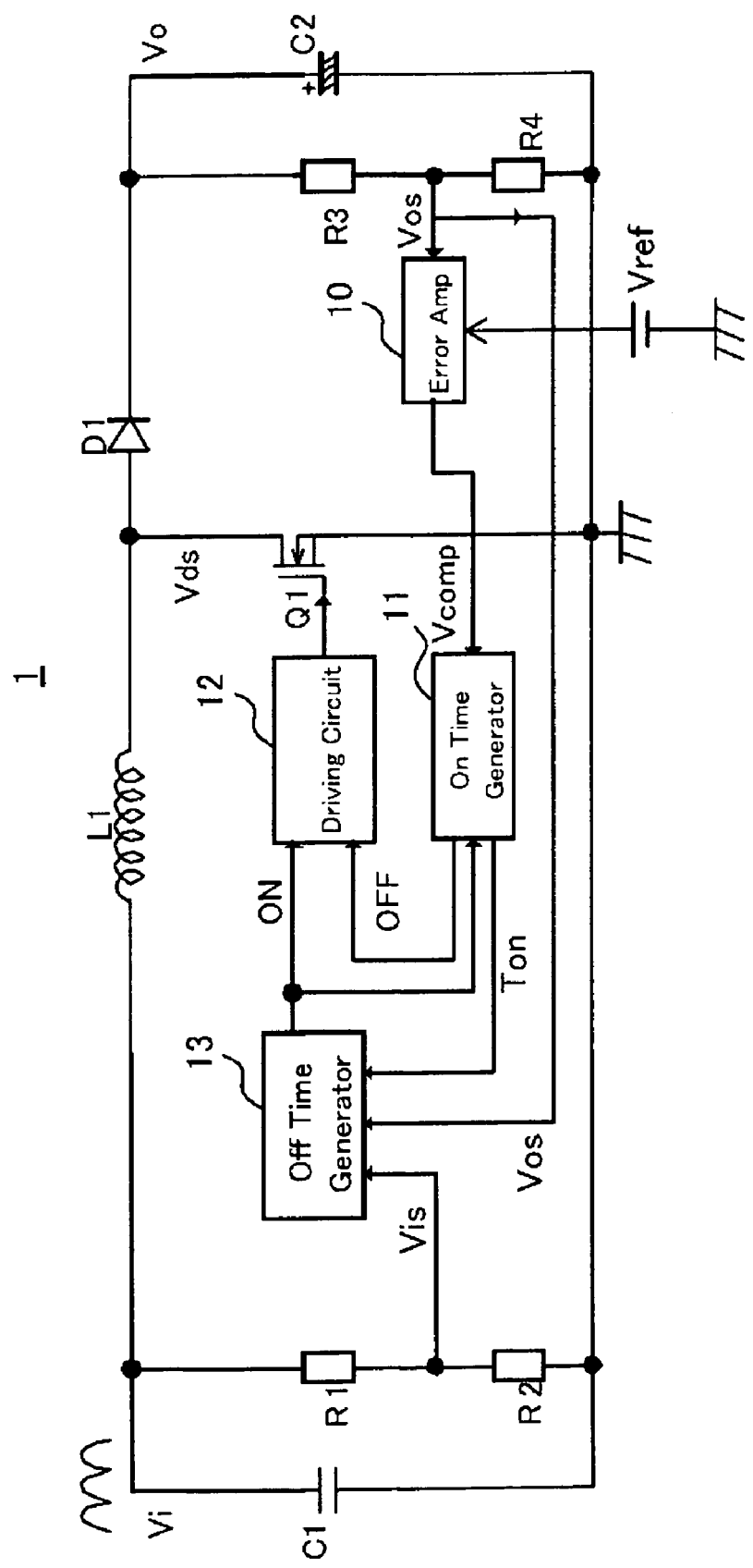
FIG. 1 is a diagram showing a concept of a switching control operation in a critical PFC converter according to an embodiment of the invention.

Embodiments of the invention will be described below in detail.

A fundamental concept of a critical PFC converter according to the invention is to perform predetermined arithmetic operations upon a value of an ON width of a switching device, a value of an input voltage and a value of an output voltage, respectively, to determine a critical point of the critical PFC converter, that is, a turn-on timing of the switching device. The fundamental concept will be described below further in detail.

Consider the aforementioned background-art critical PFC converter. The frequency of the input voltage Vi and the ripple frequency of the output voltage Vo are not more than 50 Hz to 60 Hz and 100 Hz to 120 Hz respectively. A switching frequency of approximately 100 kHz is often used. Based on this point, the switching frequency is about 1,000 times as high as the ripple frequency of the input voltage Vi and the output voltage Vo. Accordingly, the input voltage Vi and the output voltage Vo can be regarded as constant in one switching cycle. If the input voltage. Vi can be regarded as constant in one switching cycle, a charging current ΔIon of an inductor in one switching cycle can be expressed as the following expression (1).

$$\Delta Ion = \frac{Vi \cdot Ton}{L} \quad (1)$$

Ton designates the ON width of the switching device. L designates the inductance of the inductor as described above. If the output voltage Vo can be also regarded as constant, a discharging current ΔIoff of the inductor in one switching cycle can be expressed as the following expression (2)

$$\Delta Ioff = \frac{(Vo - Vi) \cdot Toff}{L} \quad (2)$$

Toff designates the OFF width of the switching device. As described above, the boost converter has a relationship that the output voltage Vo is higher than the input voltage Vi. It is known that when the inductor current decreases, the inductor current decreases with a slope of (Vo−Vi)/L.

In the critical operation, the charging current of the inductor is equal to the discharging current of the inductor. From the aforementioned expressions (1) and (2), therefore, the relationship between the OFF width and the ON width of the switching device can be expressed as the following expression (3).

$$Toff = \frac{Vi \cdot Ton}{(Vo - Vi)} \quad (3)$$

From the expression (3), the OFF width Toff of the switching device can be obtained if the ON width Ton of the switching device, the input voltage Vi and the output voltage Vo are known. If the OFF width Toff of the switching device is known, a critical point can be detected. When the switching device is turned on at the detected critical point, a critical operation can be achieved.

FIG. 1 is a diagram showing the concept of the switching control operation in a critical PFC converter 1 according to an embodiment of the invention. When switching of the switching device is controlled by PWM (Pulse Width Modulation), the ON width Ton of the switching device can be regarded as proportional to a value (voltage) Vcomp of an error signal Comp outputted from an error amplifier 10 (hereinafter, referred to as "COMP voltage Vcomp"). When the ON width Ton of the switching device is determined based on this fact, the ON width Ton of the switching device can be expressed as the following expression (4). In FIG. 1, resistors R1 and R2 divide an input voltage Vi to generate an input voltage detection signal Vis, and resistors R3 and R4 divide an output voltage Vo to generate an output voltage detection signal Vos. The resistors R1 and R2 or the resistors R3 and R4 may be omitted, and the input voltage Vi may be used directly as the input voltage detection signal Vis, or the output voltage Vo may be used directly as the output voltage detection signal Vos. The COMP voltage Vcomp outputted from the error amplifier 10 is a signal obtained by amplifying a difference between the output voltage detection signal Vos which is a detected voltage of the output voltage Vo, and a reference voltage Vref.

$$Ton = (Vcomp - Vbias) \cdot k \quad (4)$$

In the expression (4), k and Vbias are constants. Vbias may take a negative value or a zero value as well as a positive value. When the expression (4) is substituted into the expression (3), the OFF width Toff of the switching device allowed to perform a critical operation can be expressed as the following expression (5).

$$Toff = \frac{Vi \cdot (Vcomp - Vbias)}{(Vo - Vi)} \cdot k \quad (5)$$

In the above consideration, the ON width Ton is created from the expression (4) by an ON time generator 11 using the COMP voltage Vcomp outputted from the error amplifier 10. Thus, the turn-off timing (termination timing of the ON width Ton) of the switching device Q1 can be known. A (switch) OFF signal is supplied to a driving circuit 12 at that turn-off timing. On the other hand, the OFF width Toff is created from the expression (5) by an OFF time generator 13 using the input voltage detection signal Vis, the output voltage detection signal Vos which is a detected voltage of the output voltage Vo, and the ON width Ton of the switching device generated by the ON time generator 11. Thus, the turn-on timing (critical point or termination timing of the OFF width Toff) of the switching device Q1 can be also known. A (switch) ON signal is supplied to the driving circuit 12 at that turn-on timing. Based on the (switch) OFF signal and the (switch) ON signal supplied to the driving circuit 12, the driving circuit 12 ON/OFF controls the switching device Q1. Thus, it is possible to realize a critical high power factor (PFC) switching power supply unit, that is, a power factor correction power supply unit.

Figure 2:
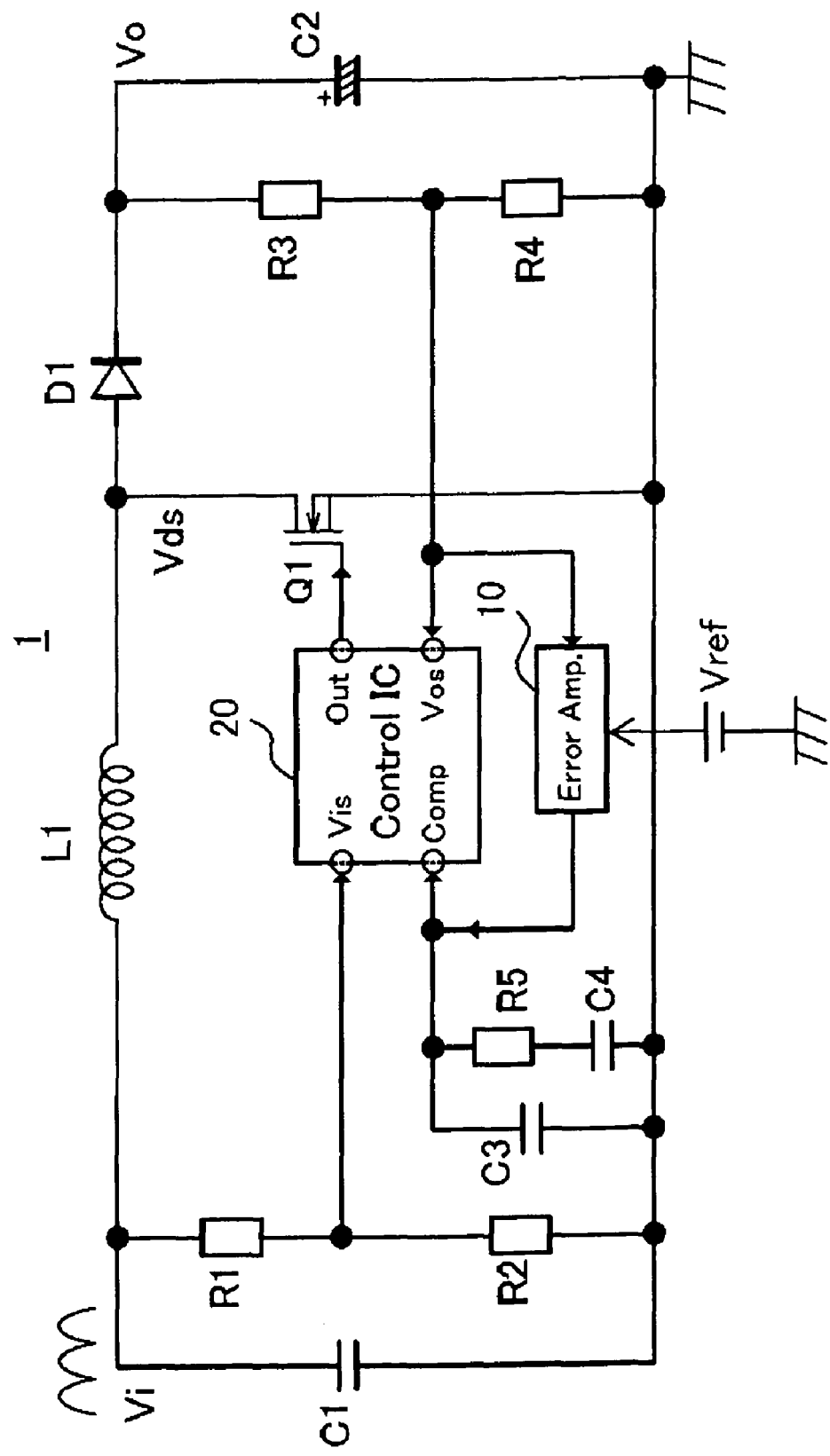
FIG. 2 is a diagram showing an embodiment of a critical PFC circuit for realizing the critical PFC converter according to the embodiment of the invention shown in FIG. 1.

FIG. 2 is a diagram showing an embodiment of a critical PFC circuit for realizing the critical PFC converter 1 according to the embodiment of the invention shown in FIG. 1. In the embodiment of the critical PFC circuit in FIG. 2, as already described in FIG. 1, Vis designates the detected voltage of the input voltage Vi, which can be expressed by voltage dividing of the resistors R1 and R2 as the following expression (6).

$$Vis = Mi \cdot Vi \quad (6)$$

Here, Mi designates a constant depending on the voltage dividing ratio of the resistors R1 and R2. When the input voltage Vi is used directly as the input voltage detection signal Vis as described above, Mi is set as Mi=1. As already described in FIG. 1, Vos designates the detected voltage of the output voltage Vo, which can be expressed by voltage dividing of the resistors R3 and R4 as the following expression (7).

$$Vos = Mo \cdot Vo \quad (7)$$

Here, Mo designates a constant depending on the voltage dividing ratio of the resistors R3 and R4. When the output voltage Vo is used directly as the output voltage detection signal Vo as described above, Mo is set as Mo=1. The OFF width Toff of the switching device is computed by the following expression (8) in conformity with the above expression (5).

$$Toff = \frac{Vis \cdot (Vcomp - Vbias)}{(Vos - Vis)} \cdot k \quad (8)$$

Further, when the expressions (6) and (7) are substituted into the expression (8), the OFF width Toff of the switching device can be expressed as the following expression (9).

$$Toff = \frac{Mi \cdot Vi(Vcomp - Vbias)}{(Mo \cdot Vo - Mi \cdot Vi)} \cdot k = \frac{Vi \cdot (Vcomp - Vbias)}{\left(\frac{Mo}{Mi} \cdot Vo - Vi\right)} \cdot k \quad (9)$$

Compare the expression (9) with the expression (5). When Mo is larger than Mi, the OFF width Toff of the switching device is smaller than an OFF width required for critical operation. Thus, the switching device performs continuous operation. Therefore, in order to prevent the continuous operation, it is necessary to set Mo to be equal to or slightly smaller than Mi.

In the embodiment of the critical PFC circuit shown in FIG. 2, C3, C4 and R5 designate circuit elements for phase compensation. C designates a capacitor and R designates a resistor. A control IC 20 shows that circuits including the ON time generator 11, the driving circuit 12 and the OFF time generator 13 shown in FIG. 1 are integrated by IC (Integrated Circuit) technology. Although the error amplifier 10 is depicted outside the control IC 20 for the sake of explanation, in fact the error amplifier 10 is also provided inside the control IC 20. Although the switching device Q1 is shown as a single element in FIGS. 1 and 2, a plurality of switching devices may be connected in parallel.

Figure 3:
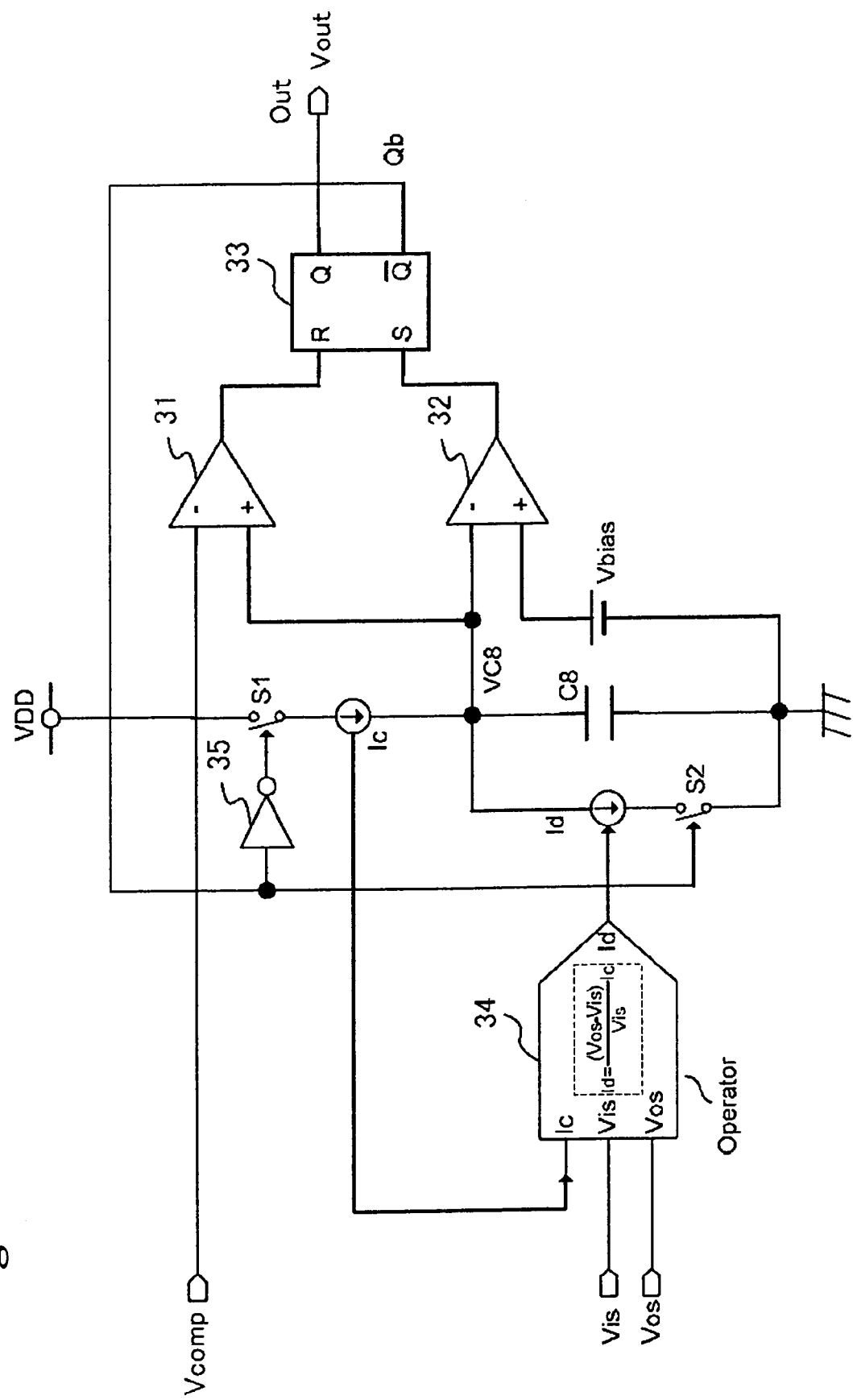
FIG. 3 is a diagram showing a circuit configuration of a control IC for use in the critical PFC circuit shown in FIG. 2.
Figure 4:
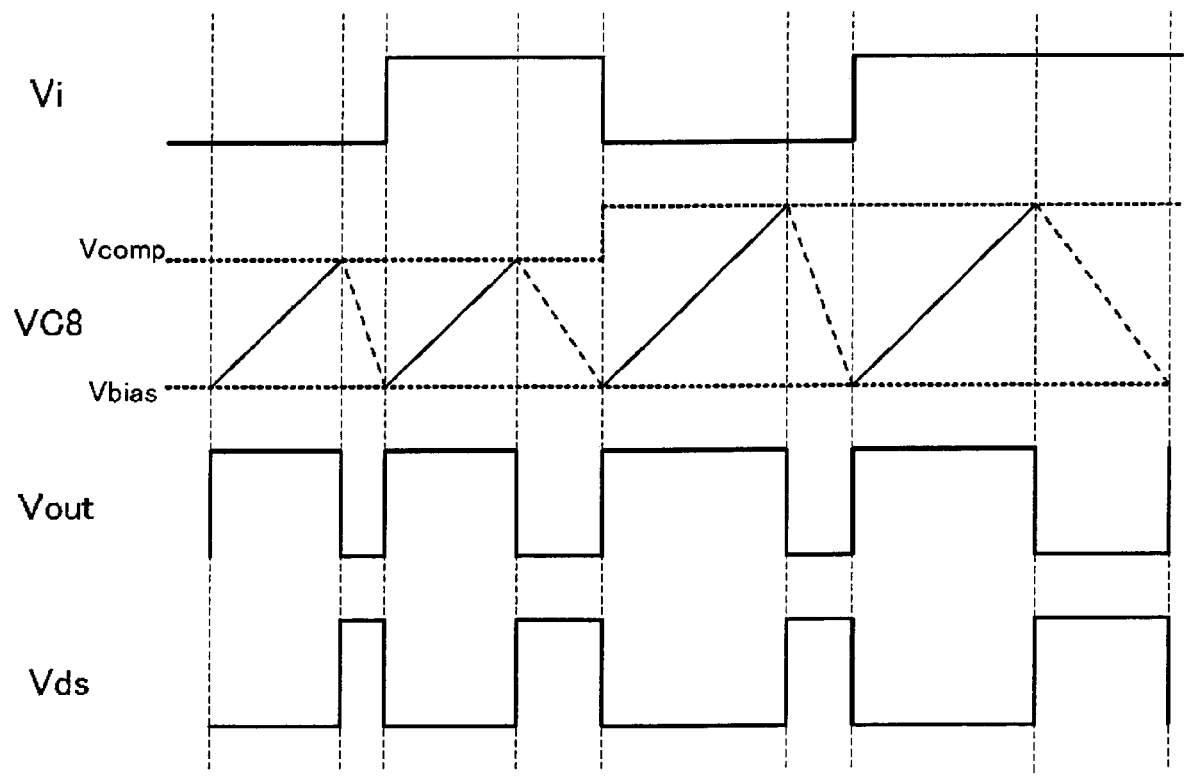
FIG. 4 is a timing chart for explaining a circuit operation of the control IC shown in FIG. 3.

FIG. 3 is a diagram showing a circuit configuration of a control IC for use in the critical PFC circuit shown in FIG. 2. FIG. 4 is a timing chart for explaining the circuit operation of the control IC shown in FIG. 3. As shown in FIG. 3, a voltage VC8 obtained by charging/discharging of a capacitor C8 is supplied to a first comparator 31 and compared with the COMP voltage Vcomp, and the comparison result of the first comparator 31 is supplied to a reset terminal R of an RS (Reset Set type) flip-flop 33. On the other hand, the voltage VC8 obtained by charging/discharging of the capacitor C8 is supplied to a second comparator 32 and compared with the bias voltage Vbias, and the comparison result of the second comparator 32 is supplied to a set terminal S of the RS flip-flop 33. A Q output of the RS flip-flop 33 is supplied as an output signal Vout to an Out terminal. The output signal Vout is supplied to a gate of the switching device Q1 shown in FIG. 2, to control the switching device Q1. In addition, a Q-bar output (inverted output with respect to the Q output) of the RS flip-flop 33 is supplied not only to a control portion (not shown) of a switch S1 through an inverting circuit (inverter) 35 to control ON/OFF of the switch S1 but also to a control portion (not shown) of a switch S2 to control ON/OFF of the switch S2. Vds in the timing chart of FIG. 4 designates a drain-to-source voltage of the switching device Q1 shown in FIG. 2.

In FIG. 4, one switching cycle extends from a leading edge of the output signal Vout to the next leading edge thereof. FIG. 4 shows four switching cycles. In the four switching cycles, switching operations in four kinds of states are shown. The four kinds of states are combinations of the COMP voltage Vcomp (low or high) and the input voltage Vi (low or high). FIG. 4 shows as if the four kinds of states appeared successively. However, that is merely for explanation. In fact, the voltages Vcomp and Vi do not vary in such a manner. As apparent from comparison of the first and second switching cycles with the third and fourth switching cycles in FIG. 4, the ON width Ton becomes long when the COMP voltage Vcomp is high. In addition, as apparent from comparison of the first and third switching cycles with the second and fourth switching cycles, the slope of the decreasing voltage VC8 becomes gentle when the input voltage Vi is high. The above description can be likewise applied to FIG. 6 which will be described later.

A charging current Ic of the capacitor C8 is fixed and controlled so that a fixed current flows from a current source (constant current source). A discharging current Id is controlled so that a current determined by computing of an operator 34 which carries out the arithmetic operation shown in the following expression (10) using Ic, Vis and Vos flows from a current source. That is, the current source determining the discharging current Id is constituted by one kind of transconductance amplifier. The charging current Ic and the discharging current Id of the capacitor C8 are applied into a charging path and a discharging path by the switches S1 and S2 turned on/off in accordance with the logic level of the Q-bar output of the RS flip-flop 33, respectively. The capacitor C8 is established inside the control IC 20 by IC technology so that the capacitor C8 can be set at a predetermined capacitance value (e.g. 10 pF).

$$Id = \frac{(Vos - Vis)}{Vis} \cdot Ic \quad (10)$$

Next, when the voltage VC8 of the capacitor C8 is charged from Vbias to Vcomp (the charging time corresponds to the ON width Ton generated by the ON time generator 11 shown in FIG. 1), the ON width of the switching device can be expressed as the following expression (11).

$$Ton = (Vcomp - Vbias) \cdot \frac{C8}{Ic} \quad (11)$$

Here, the capacitance value of the capacitor C8 is designated by the same reference sign C8. On the other hand, when the voltage VC8 of the capacitor C8 is discharged from Vcomp to Vbias (the discharging time corresponds to the OFF width Toff generated by the OFF time generator 13 shown in FIG. 1) as described above, the OFF width of the switching device can be expressed as the following expression (12).

$$Toff = (Vcomp - Vbias) \cdot \frac{C8}{Id} = \frac{Vis \cdot (Vcomp - Vbias)}{(Vos - Vis)} \cdot \frac{C8}{Ic} \quad (12)$$

The expression (12) has the same form as the expression (8). The constant k in the expression (8) can be expressed as the following expression (13).

$$k = \frac{C8}{Ic} \quad (13)$$

In this manner, in the critical PFC converter according to the invention, an operator, comparators, a capacitor, current sources, voltage sources, a charging/discharging circuit of the capacitor, etc. are provided in a control IC circuit. Further, voltages obtained by charging/discharging the capacitor are compared with a predetermined value by the comparators, and computing is performed by the operator to form a predetermined discharging current. Thus, the turn-off timing and the turn-on timing are determined. Based on the turn-off timing and the turn-on timing, a (switch) OFF signal and a (switch) ON signal are supplied to the gate of the switching device Q1 through the Out terminal of the control IC circuit so as to control the switching device Q1. Thus, a high power factor (PFC) switching power supply unit, that is, a power factor correction power supply unit is realized.

Figure 5:
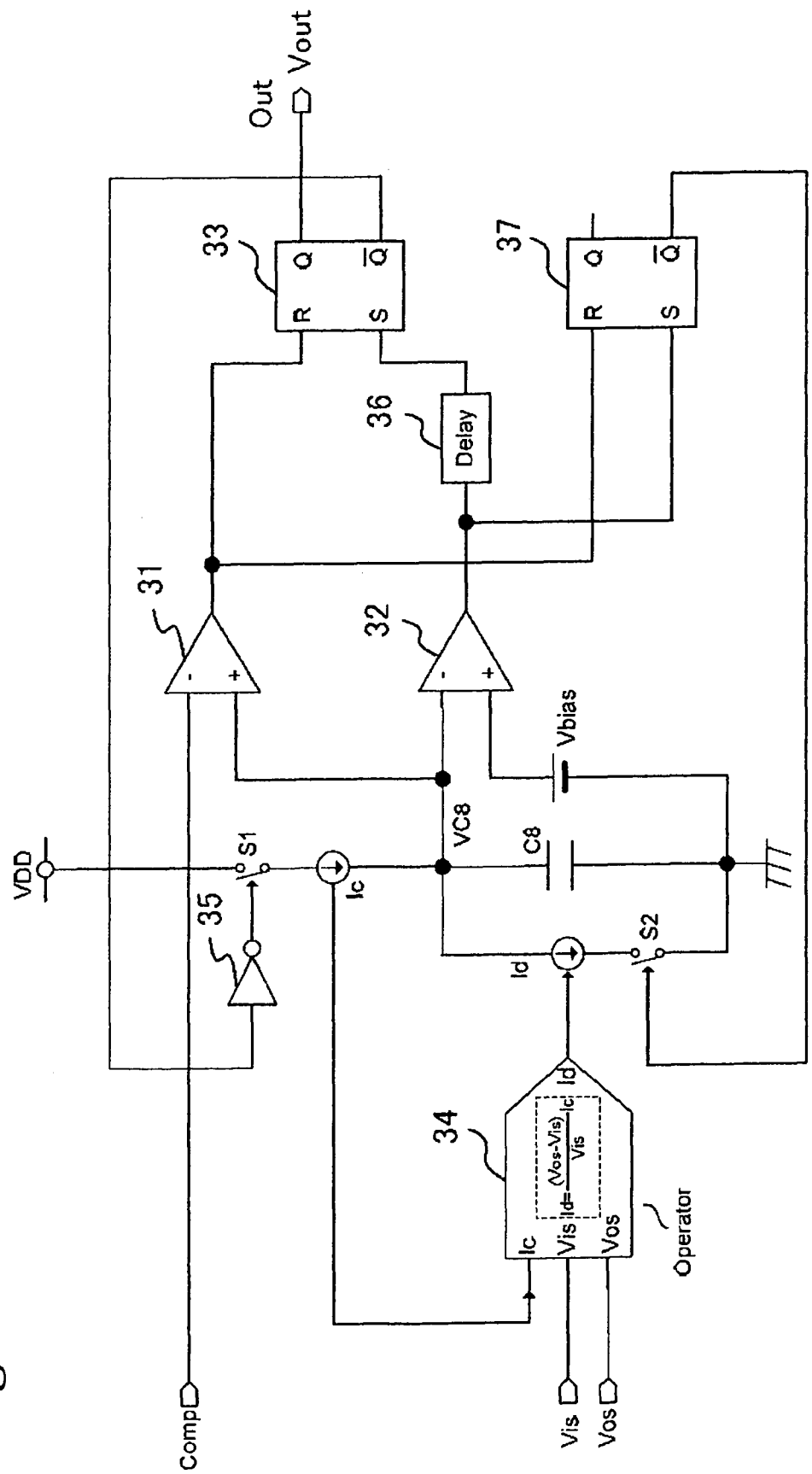
FIG. 5 is a diagram showing a circuit configuration of a control IC where an ON delay has been inserted in the circuit shown in FIG. 3.
Figure 6:
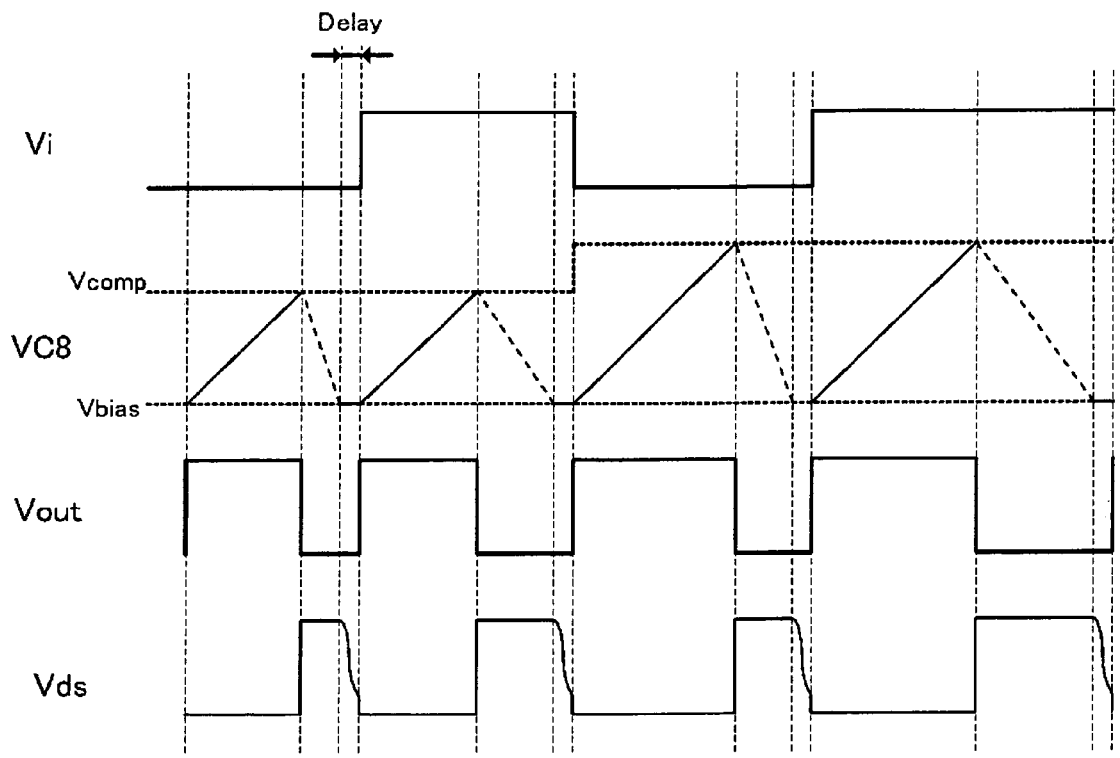
FIG. 6 is a timing chart for explaining a circuit operation of the control IC shown in FIG. 5.

FIG. 5 is a diagram showing a circuit configuration of a control IC in which an ON delay has been inserted in the circuit shown in FIG. 3. Here, the "ON delay" means a delay of the turn-on timing and is referred to as an abbreviation for a delay of the turning-on timing (the same rule will apply hereinafter). FIG. 6 is a timing chart for explaining the circuit operation of the control IC shown in FIG. 5. In the circuit configuration of the control IC shown in FIG. 3, the turn-on timing and the turn-off timing are determined only by computing. It is therefore likely that those timings may be out of zero-current switching leading to a critical operation due to accumulated computing errors. To solve the problem, in the circuit configuration of the control IC shown in FIG. 5, a delay circuit for providing an ON delay is introduced so as not to accumulate computing errors. Thus, a danger of accumulation of computing errors is excluded.

As shown in FIG. 5, a voltage VC8 obtained by charging/discharging of a capacitor C8 is supplied to a first comparator 31 and compared with the COMP voltage Vcomp, and the comparison result of the first comparator 31 is supplied to reset terminals R of a (first) RS flip-flop 33 and a (second) RS flip-flop 37. On the other hand, the voltage VC8 obtained by charging/discharging of the capacitor C8 is supplied to a second comparator 32 and compared with the bias voltage Vbias, and the comparison result of the second comparator 32 is supplied to a delay circuit 36. An ON-delayed output of the delay circuit 36 is supplied to a set terminal S of the (first) RS flip-flop 33. A Q output of the (first) RS flip-flop 33 is supplied as an output signal Vout to an Out terminal. The output signal Vout is supplied to a gate of the switching device Q1 shown in FIG. 2, to control the switching device Q1. In addition, a Q-bar output of the (first) RS flip-flop 33 is supplied to a control portion (not shown) of a switch S1 through an inverting circuit (inverter) 35 to control ON/OFF of the switch S1. On the other hand, the comparison result of the second comparator 32 is supplied to a set terminal S of the (second) RS flip-flop 37. A Q-bar output of the (second) RS flip-flop 37 is supplied to a control portion (not shown) of a switch S2 to control ON/OFF of the switch S2.

A charging current Ic of the capacitor C8 is fixed and controlled so that a fixed current flows from a current source (constant current source). A discharging current Id is controlled so that a current determined by computing of an operator 34 which carries out the arithmetic operation shown in the aforementioned expression (10) using Ic, Vis and Vos flows from a current source. Also in this case, the current source determining the discharging current Id is constituted by one kind of transconductance amplifier. The charging current Ic of the capacitor C8 is applied into a charging path by the switch S1 turned on/off in accordance with the logic level of the Q-bar output of the (first) RS flip-flop 33. The discharging current Id of the capacitor C8 is applied into a discharging path by the switch S2 turned on/off in accordance with the logic level of the Q-bar output of the (second) RS flip-flop 37. Due to this configuration, even if the switch S2 is turned off (disconnected) to terminate discharging of the capacitor C8 with the discharging current Id, the switch S1 is prevented from being turned on (connected) to start charging the capacitor C8 till the ON delay (Delay shown in FIG. 6) is terminated. Vds shown in the timing chart of FIG. 6 designates the drain-to-source voltage of the switching device Q1 shown in FIG. 2.

In this manner, in the circuit configuration of the control IC shown in FIG. 5, due to the insertion of the ON delay, the OFF width Toff can be extended to assure zero-current switching even if the OFF width Toff becomes smaller than an OFF width required for critical operation due to a computing error. Thus, it is possible to exclude a danger of disturbing zero-current switching due to accumulated computing errors.

Figure 7:
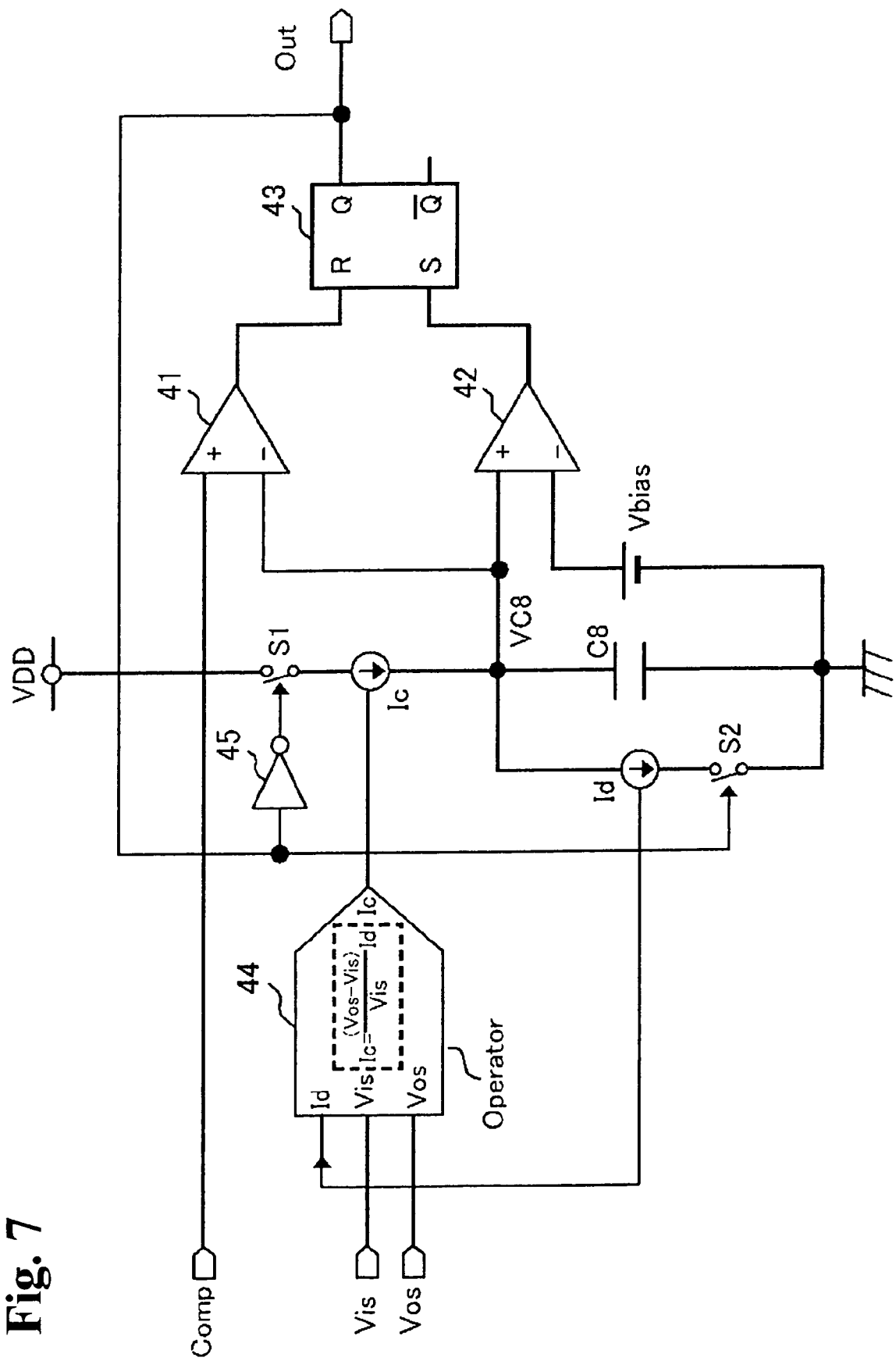
FIG. 7 is a diagram showing another example of a circuit configuration of a control IC for use in the critical PFC circuit shown in FIG. 2.
Figure 8:
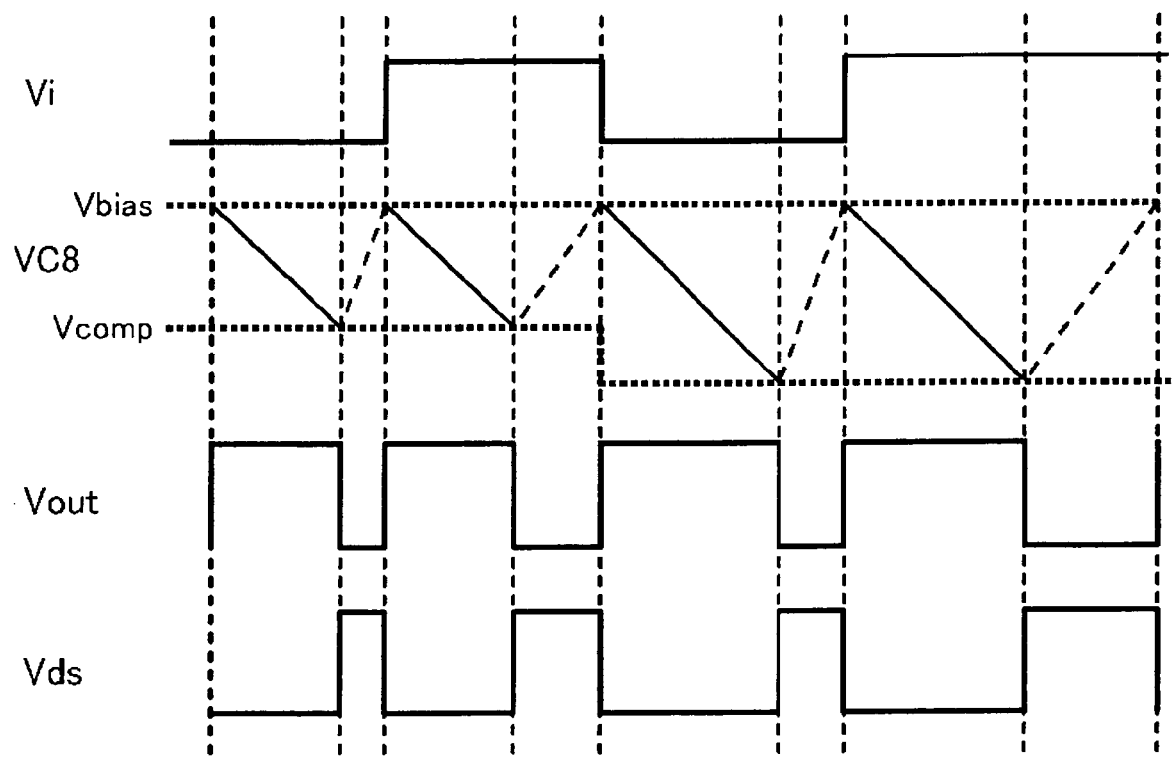
FIG. 8 is a timing chart for explaining a circuit operation of the control IC shown in FIG. 7.

FIG. 7 is a diagram showing another example of the circuit configuration of a control IC for use in the critical PFC circuit shown in FIG. 2. FIG. 7 shows the circuit configuration of the control IC where the bias voltage Vbias is higher than the COMP voltage Vcomp. FIG. 8 is a timing chart for explaining the circuit operation of the control IC shown in FIG. 7. As shown in FIG. 7, a voltage VC8 obtained by charging/discharging of a capacitor C8 is supplied to a first comparator 41 and compared with the COMP voltage Vcomp, and the comparison result of the first comparator 41 is supplied to a reset terminal R of an RS flip-flop 43. On the other hand, the voltage VC8 obtained by charging/discharging of the capacitor C8 is supplied to a second comparator 42 and compared with the bias voltage Vbias, and the comparison result of the second comparator 42 is supplied to a set terminal S of the RS flip-flop 43. A Q output of the RS flip-flop 43 is supplied as an output signal Vout to an Out terminal. The output signal Vout is supplied to a gate of the switching device Q1 shown in FIG. 2, to control the switching device Q1. In addition, the Q output of the RS flip-flop 43 is supplied to a control portion (not shown) of a switch S1 through an inverting circuit (inverter) 45 to control ON/OFF of the switch S1, and also supplied to a control portion (not shown) of a switch S2 to control ON/OFF of the switch S2. Vds shown in the timing chart of FIG. 8 designates the drain-to-source voltage of the switching device Q1 shown in FIG. 2.

In FIG. 8, one switching cycle extends from a leading edge of the output signal Vout to the next leading edge thereof. FIG. 8 shows four switching cycles. In the four switching cycles, switching operations in four kinds of states are shown. The four kinds of states are combinations of the COMP voltage Vcomp (low or high) and the input voltage Vi (low or high). FIG. 8 shows as if the four kinds of states appeared successively. However, that is merely for explanation. In fact, the voltages Vcomp and Vi do not vary in such a manner. As apparent from comparison of the first and second switching cycles with the third and fourth switching cycles in FIG. 8, the ON width Ton becomes long when the COMP voltage Vcomp is low. In addition, as apparent from comparison of the first and third switching cycles with the second and fourth switching cycles, the slope of the increasing voltage VC8 becomes gentle when the input voltage Vi is high. The above description can be likewise applied to FIG. 10 which will be described later.

A discharging current Id of the capacitor C8 is fixed and controlled so that a fixed current flows from a current source (constant current source). A charging current Ic is controlled so that a current determined by computing of an operator 44 which carries out the arithmetic operation shown in the following expression (14) using Id, Vis and Vos flows from a current source. That is, the current source determining the discharging current Ic is constituted by one kind of transconductance amplifier. The charging current Ic and the discharging current Id of the capacitor C8 are applied into a charging path and a discharging path by the switches S1 and S2 turned on/off in accordance with the logic level of the Q output of the RS flip-flop 43, respectively. The capacitor C8 is established inside the control IC 20 by IC technology so that the capacitor C8 can be set at a predetermined capacitance value (e.g. 10 pF).

$$Ic = \frac{(Vos - Vis)}{Vis} \cdot Id \qquad (14)$$

Next, when the voltage VC8 of the capacitor C8 is discharged from Vbias to Vcomp (the discharging time corresponds to the ON width Ton generated by the ON time generator 11 shown in FIG. 1), the ON width of the switching device can be expressed as the following expression (15).

$$Ton = (Vbias - Vcomp) \cdot \frac{C8}{Id} \qquad (15)$$

Here, the capacitance value of the capacitor C8 is designated by the same reference sign C8. On the other hand, when the voltage VC8 of the capacitor C8 is charged from Vcomp to Vbias (the charging time corresponds to the OFF width Toff generated by the OFF time generator 13 shown in FIG. 1) as described above, the OFF width of the switching device can be expressed as the following expression (16).

$$Toff = (Vcomp - Vbias) \cdot \frac{C8}{Ic} = \frac{Vis \cdot (Vcomp - Vbias)}{(Vos - Vis)} \cdot \frac{C8}{Id} \qquad (16)$$

Accordingly, the expression (16) has the same form as the expression (8). The constant k in the expression (8) can be expressed as the following expression (17).

$$k = \frac{C8}{Id} \qquad (17)$$

In this manner, in the critical PFC converter according to the invention, an operator, comparators, a capacitor, current sources, voltage sources, a charging/discharging circuit of the capacitor, etc. are provided in a control IC circuit. Further, voltages obtained by charging/discharging the capacitor are compared with a predetermined value by the comparators, and computing is performed by the operator to form a predetermined charging current. Thus, the turn-off timing and the turn-on timing are determined. Based on the turn-off timing and the turn-on timing, a (switch) OFF signal and a (switch) ON signal are supplied to the gate of the switching device Q1 through the Out terminal of the control IC circuit so as to control the switching device Q1. Thus, a high power factor (PFC) switching power supply unit, that is, a power factor correction power supply unit is realized.

Figure 9:
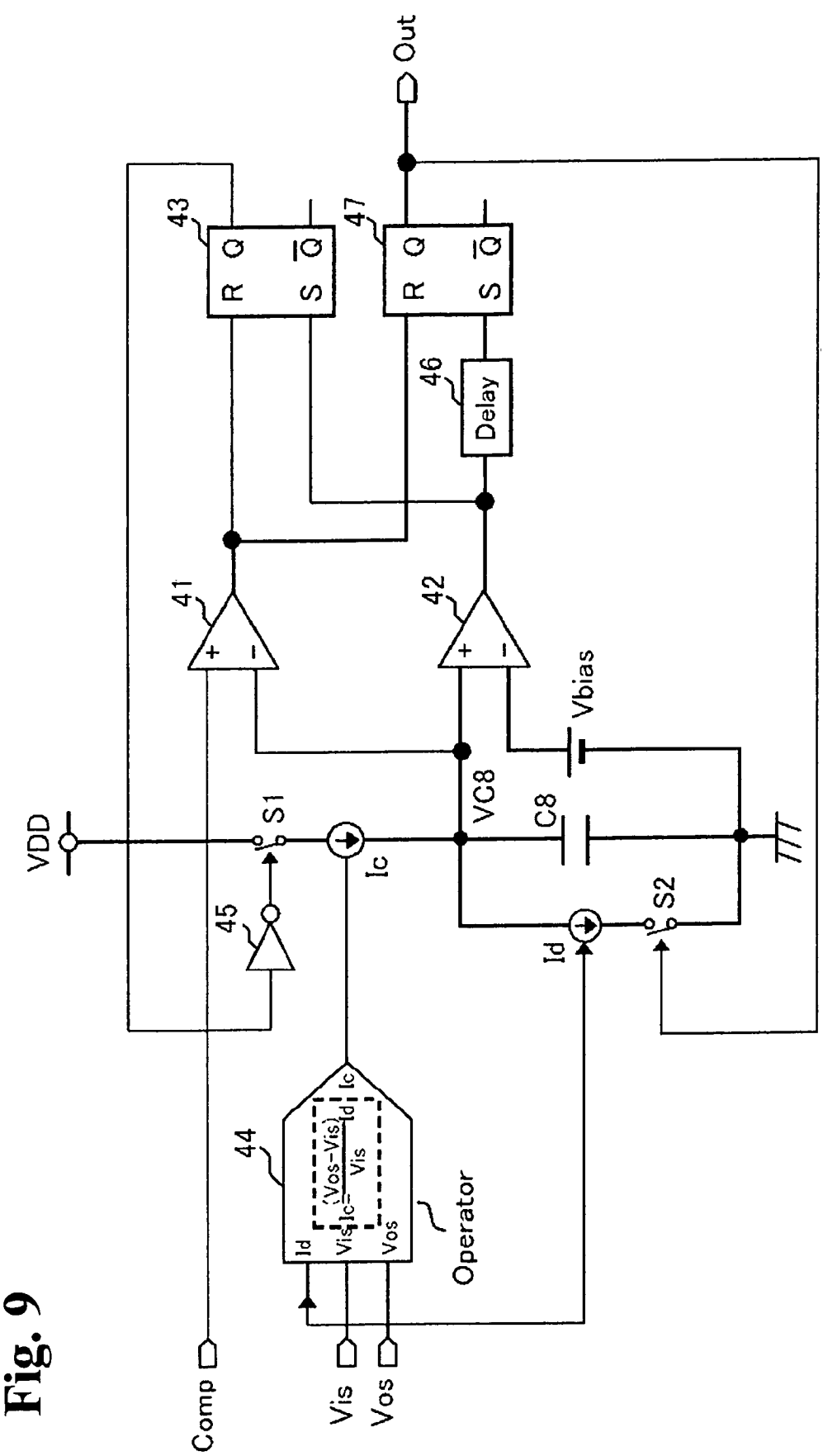
FIG. 9 is a diagram showing a circuit configuration of a control IC where an ON delay has been further inserted in the circuit shown in FIG. 7.
Figure 10:
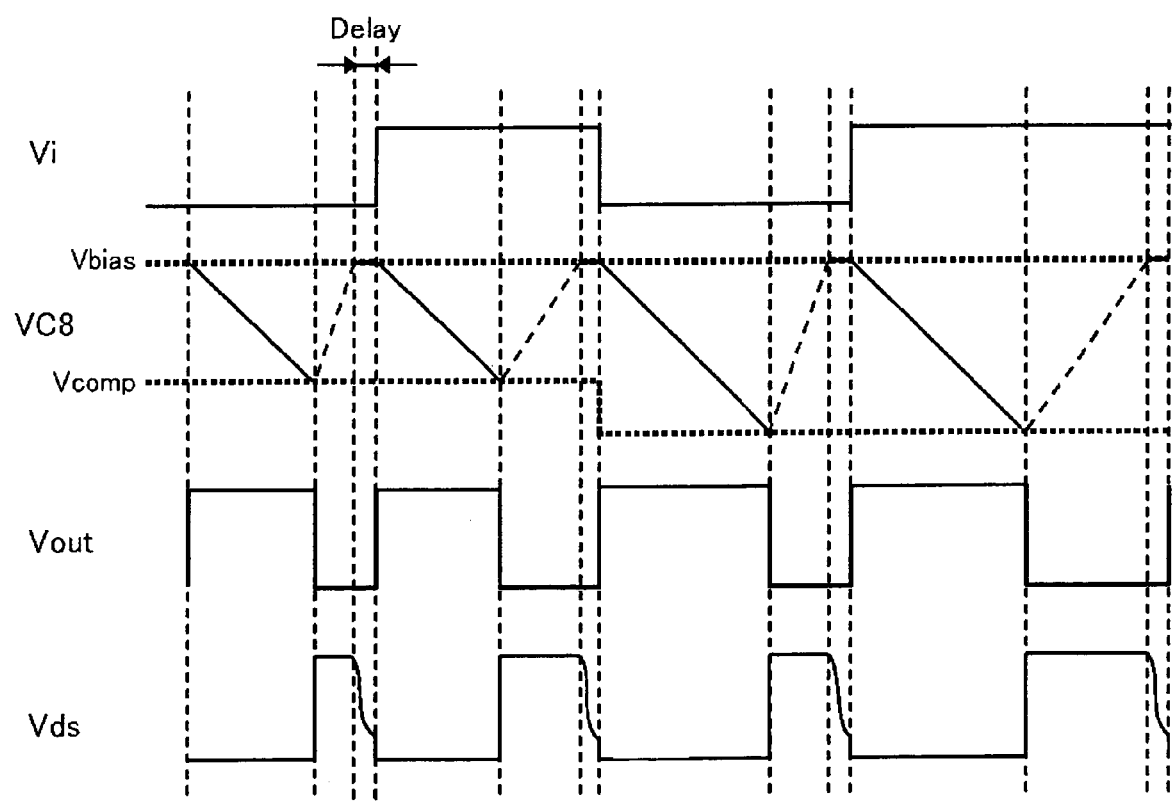
FIG. 10 is a timing chart for explaining a circuit operation of the control IC shown in FIG. 9.
Figure 11:
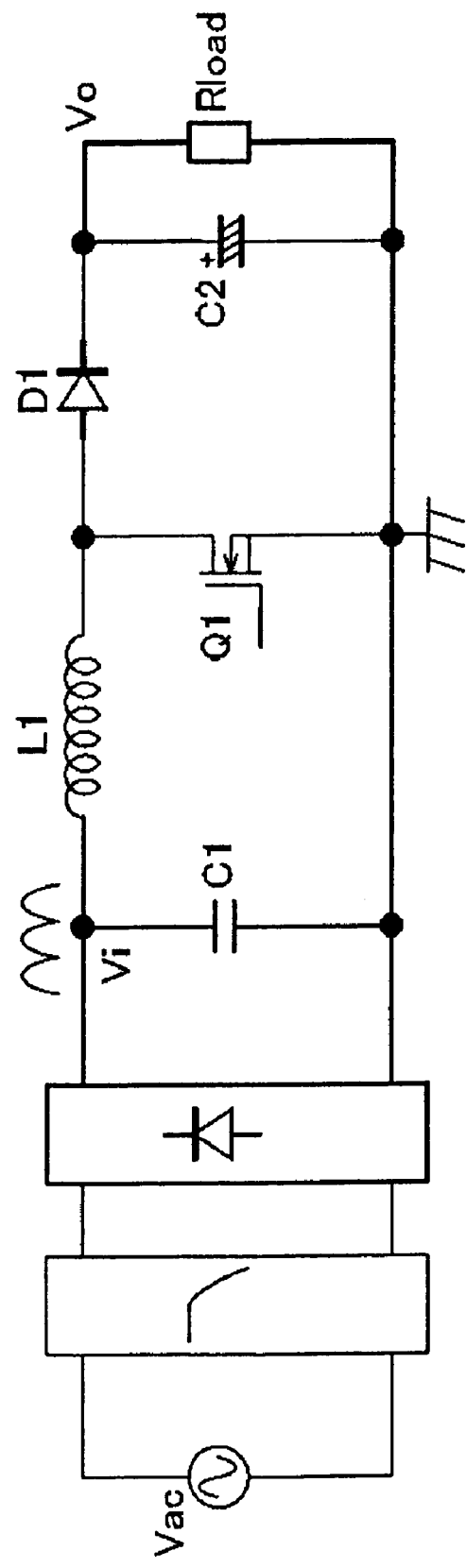
FIG. 11 is a diagram showing a configuration of a conventional type PFC converter.
Figure 12:
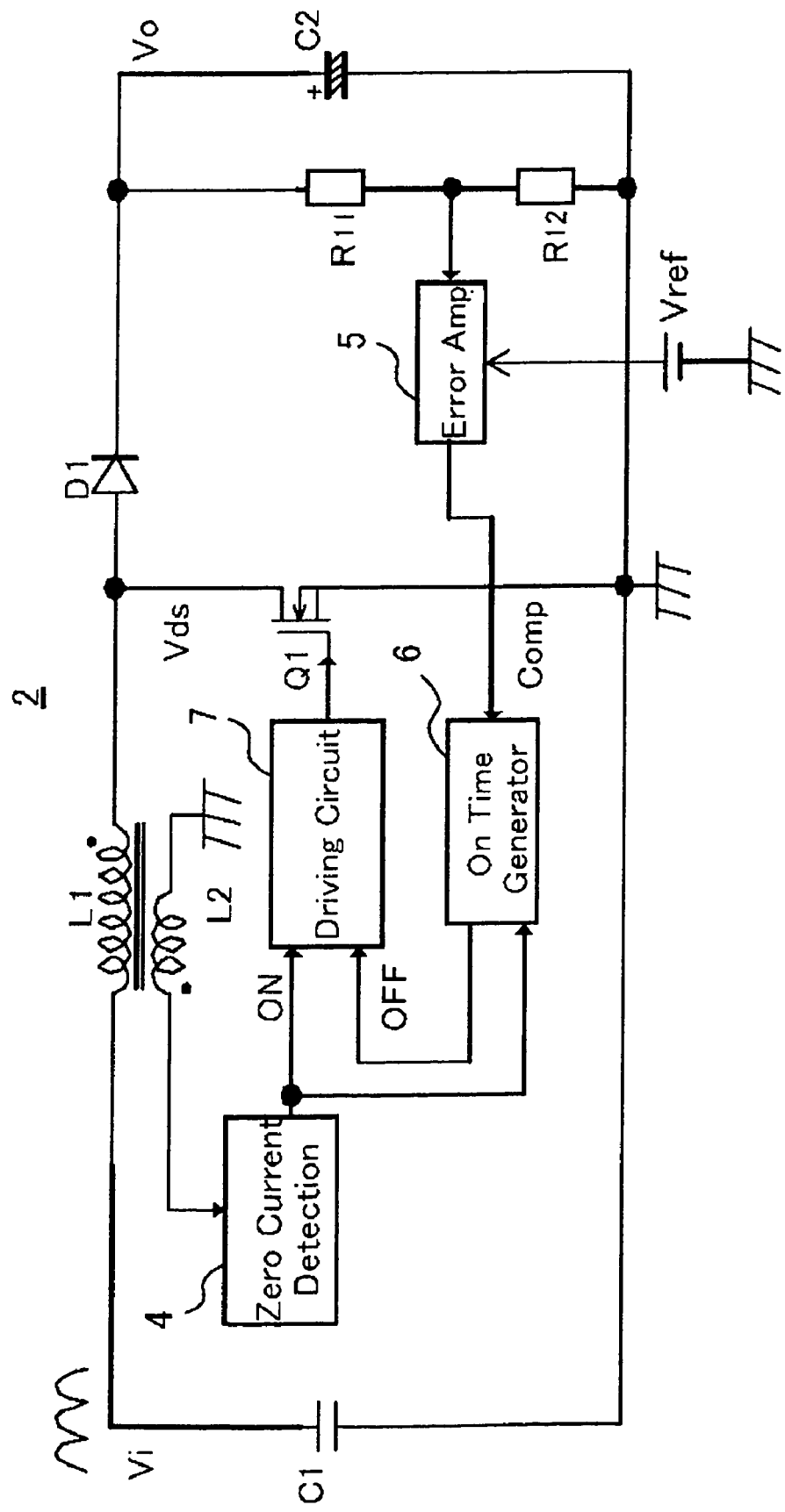
FIG. 12 is a diagram showing a configuration of a conventional type critical PFC converter with a drain voltage detection system.
Figure 13:
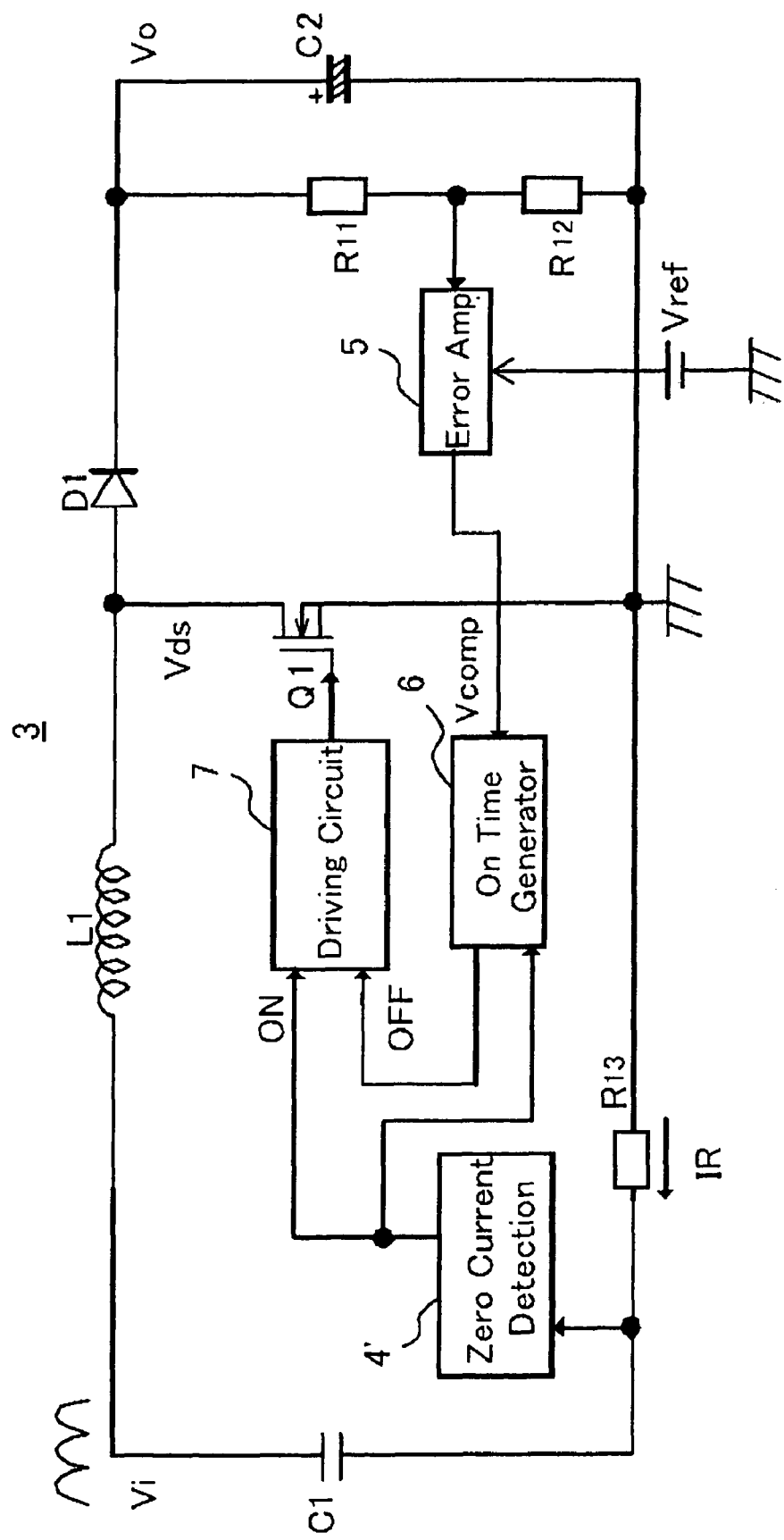
FIG. 13 is a diagram showing a configuration of a conventional type critical PFC converter with a minus current detection system.
Figure 14:
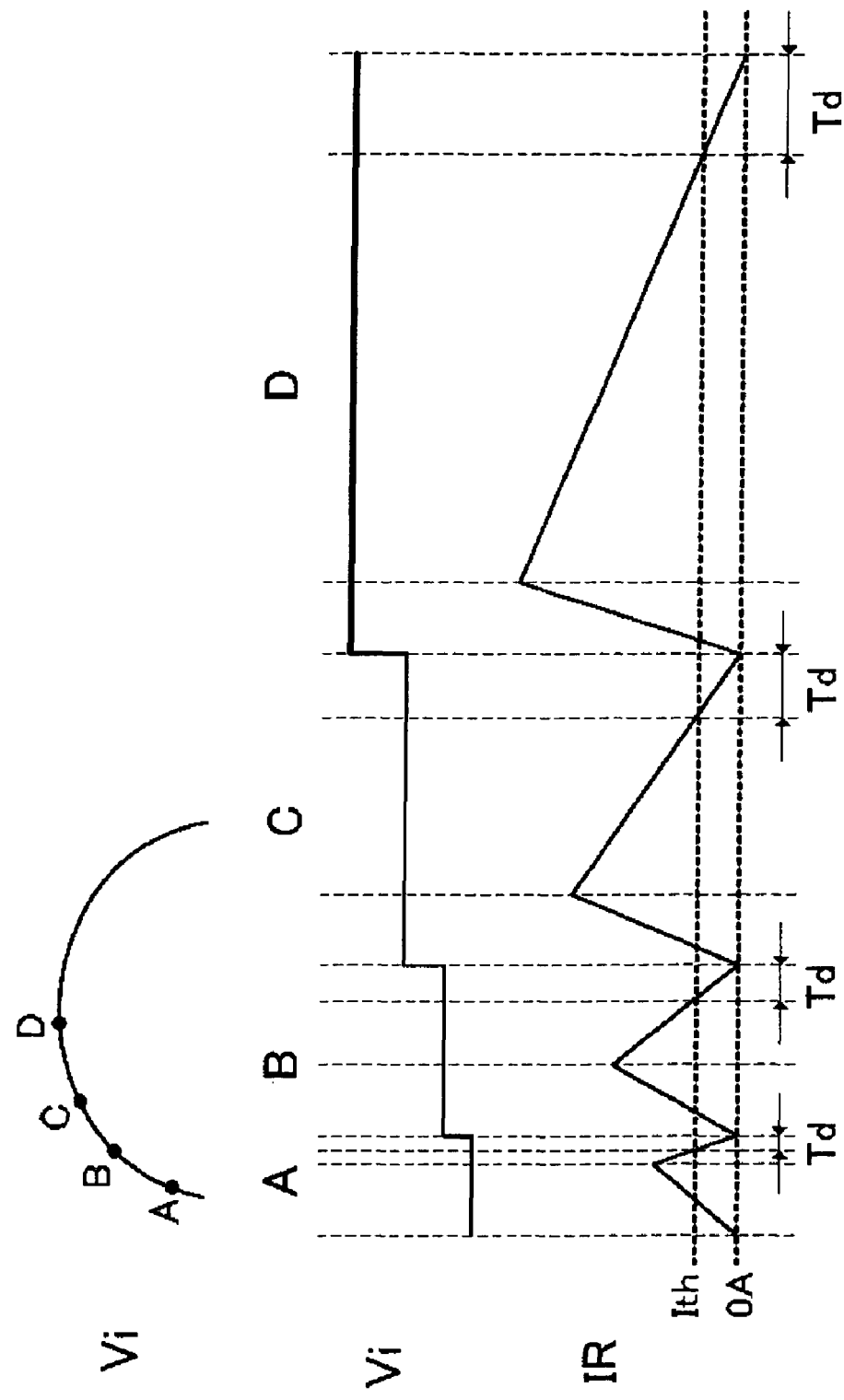
FIG. 14 is a timing chart for explaining an operation in FIG. 13.
Figure 15:
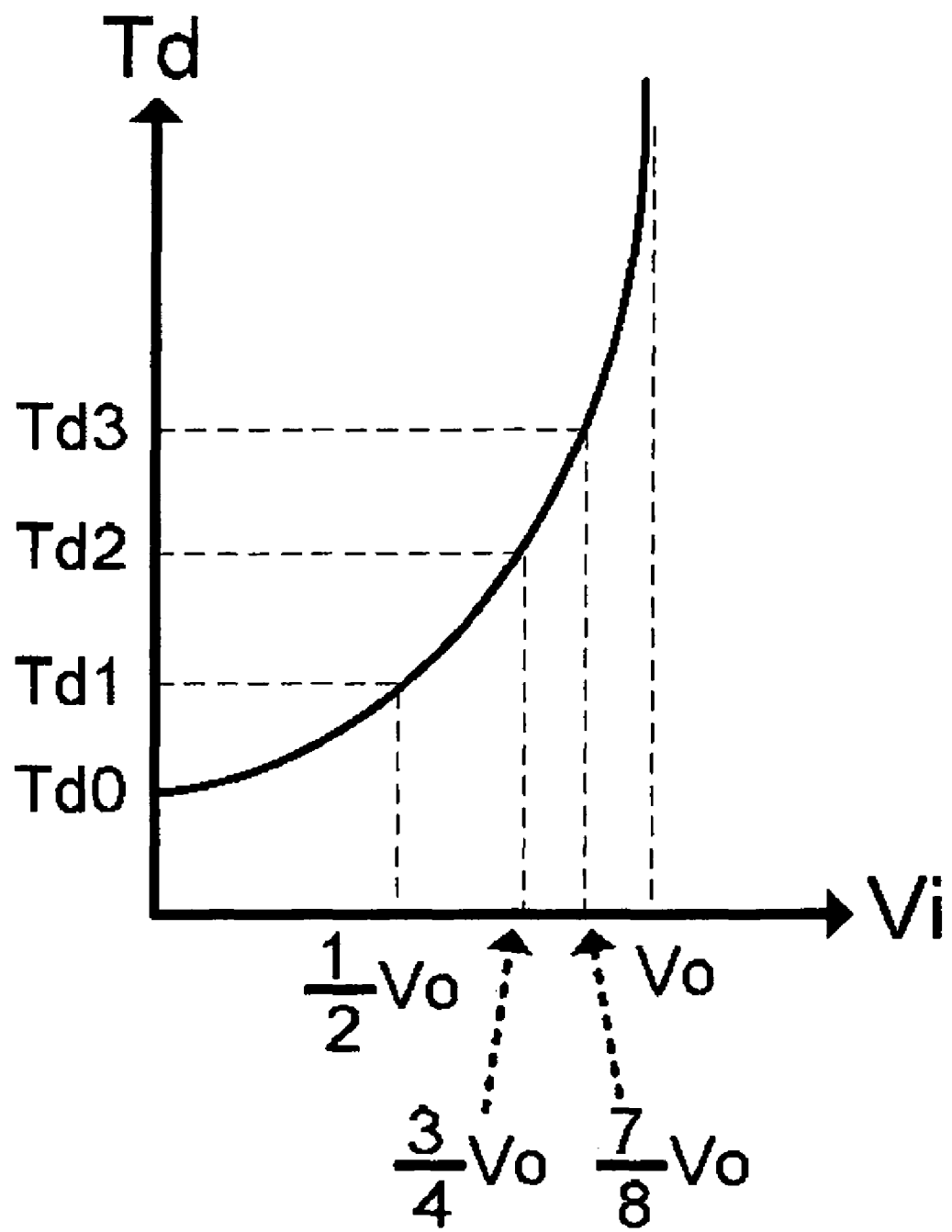
FIG. 15 is a graph showing a relationship between a delay time Td and an input voltage Vi shown in FIG. 14.
Figure 16:
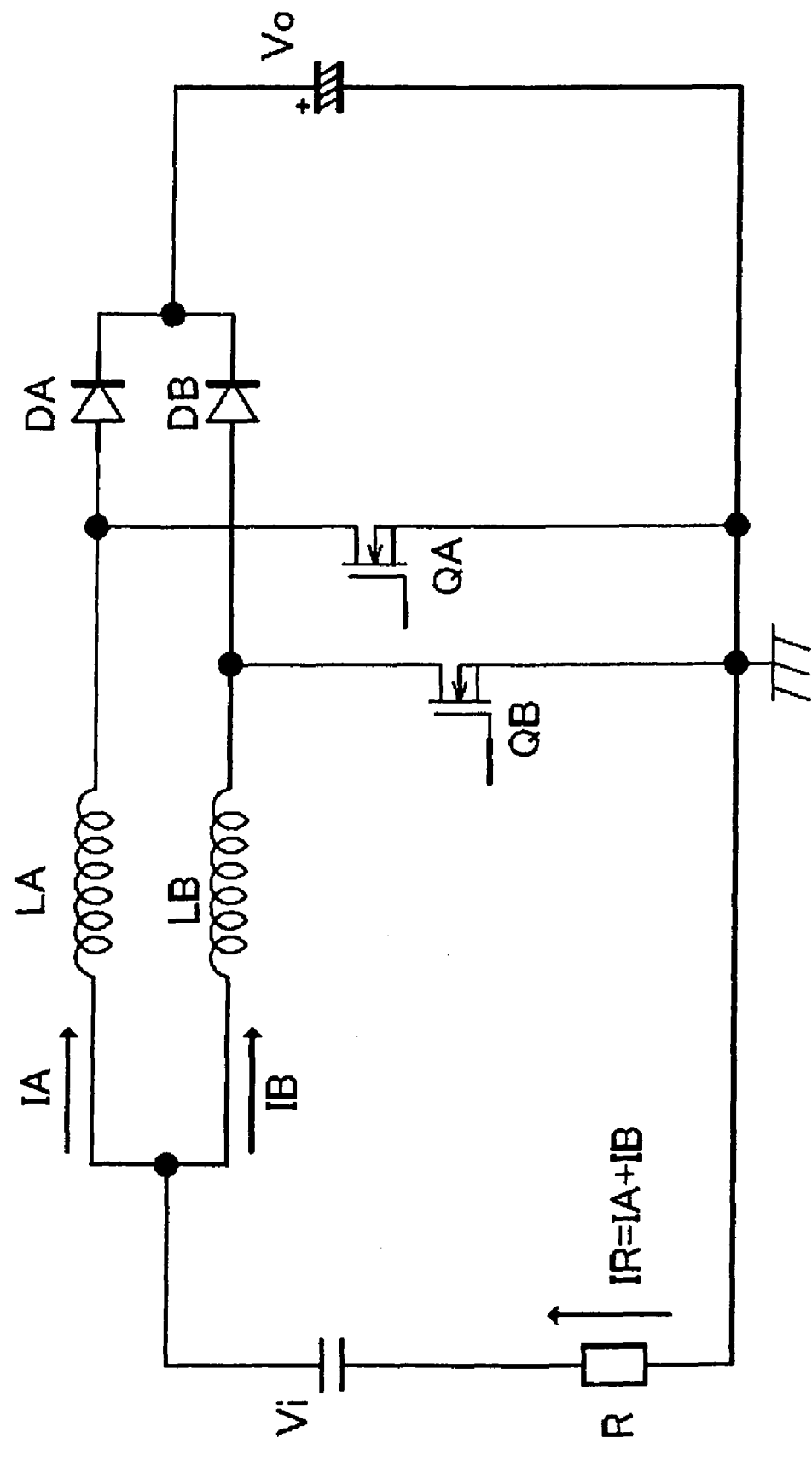
FIG. 16 is a diagram showing an example of a configuration where a conventional type minus current detection system has been applied to two-phase critical interleave.
Figure 17:
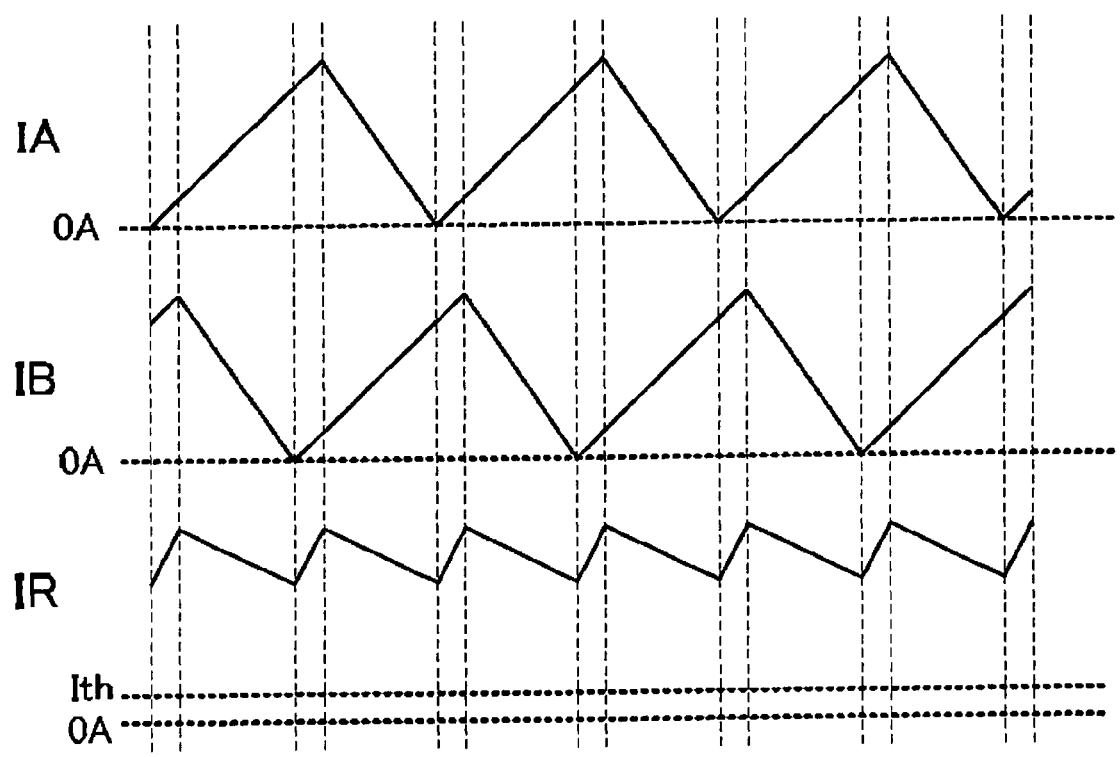
FIG. 17 is a timing chart for explaining an operation in FIG. 16.

FIG. 9 is a diagram showing a circuit configuration of a control IC in which an ON delay has been further inserted in the circuit shown in FIG. 7. Here, the "ON delay" means a delay of the turn-on timing as described above and is referred to as an abbreviation for a delay of the turn-on timing. FIG. 10 is a timing chart for explaining the circuit operation of the control IC shown in FIG. 9. In the Circuit configuration of the control IC shown in FIG. 7, the turn-on timing and the turn-off timing are determined only by computing. There is therefore a risk that those timings may be out of zero-current switching leading to a critical operation due to accumulated computing errors. To solve the problem, in the circuit configuration of the control IC shown in FIG. 9, a delay circuit for providing an ON delay is introduced not to accumulate computing errors. Thus, the risk of accumulation of computing errors is excluded.

As shown in FIG. 9, a voltage VC8 obtained by charging/discharging of a capacitor C8 is supplied to a first comparator 41 and compared with the COMP voltage Vcomp, and the comparison result of the first comparator 41 is supplied to reset terminals R of a (first) RS flip-flop 43 and a (second) RS flip-flop 47. On the other hand, the voltage VC8 obtained by charging/discharging of the capacitor C8 is supplied to a second comparator 42 and compared with the bias voltage Vbias, and the comparison result of the second comparator 42 is supplied to a set terminal S of the (first) RS flip-flop 43. A Q output of the (first) RS flip-flop 43 is supplied to a control portion (not shown) of a switch S1 through an inverting circuit (inverter) 45 to control ON/OFF of the switch S1. On the other hand, the comparison result of the second comparator 42 is supplied to a delay circuit 46. An ON-delayed output of the delay circuit 46 is supplied to a set terminal S of the (second) RS flip-flop 47. A Q output of the (second) RS flip-flop 47 is supplied as an output-signal Vout to an Out terminal. The output signal Vout is supplied to a gate of the switching device Q1 shown in FIG. 2, to control the switching device Q1. In addition, the Q output of the (second) RS flip-flop 47 is supplied to a control portion (not shown) of a switch S2 to control ON/OFF of the switch S2.

A discharging current Id of the capacitor C8 is fixed and controlled so that a fixed current flows from a current source (constant current source). A charging current Ic is controlled so that a current determined by computing of an operator 44 which carries out the arithmetic operation shown in the aforementioned expression (14) using Id, Vis and Vos flows from a current source. That is, the current source determining the charging current Ic is constituted by one kind of transconductance amplifier. The charging current Ic of the capacitor C8 is applied into a charging path by the switch S1 turned on/off in accordance with the logic level of the Q output of the (first) RS flip-flop 43. On the other hand, the discharging current Id of the capacitor C8 is applied into a discharging path by the switch S2 turned on/off in accordance with the logic level of the Q output of the (second) RS flip-flop 47. Due to this configuration, even if the switch S1 is turned off (disconnected) to terminate charging of the capacitor C8 with the charging current Ic, the switch S2 is prevented from being turned on (connected) to start charging the capacitor C8 till the ON delay (Delay shown in FIG. 10) is terminated. Vds shown in the timing chart of FIG. 10 designates the drain-to-source voltage of the switching device Q1 shown in FIG. 2.

In this manner, in the circuit configuration of the control IC shown in FIG. 9, due to the insertion of the ON delay, the OFF width Toff can be extended to assure zero-current switching even if the OFF width Toff becomes smaller than an OFF width required for critical operation due to a computing error. Thus, it is possible to exclude a risk of disturbing zero-current switching due to accumulated computing errors.

According to the invention, as has been described, it is possible to realize a critical PFC converter requiring no auxiliary winding as in a drain voltage detection system. It is therefore possible to simplify an inductor, and it is unnecessary to take account of troubles caused by short-circuiting of the auxiliary winding. Further, there are no defects inherent to a minus current detection system. It is therefore possible to obtain effects to prevent continuous operation, to prevent malfunction due to noise, and to improve power efficiency. Further, it is also possible to design critical interleave requiring no auxiliary winding. Thus, it is possible to simplify a critical interleave power supply, to reduce the profile thereof or to reduce the cost thereof.

Furthermore, according to the invention, an ON delay is inserted so that it is possible to assure zero-current switching in the switching of a switching device. It is therefore possible to exclude a risk of disturbing zero-current switching due to accumulated computing errors.

The disclosures of Japanese Patent Applications No. 2008-249791 filed on Sep. 29, 2008 and No. 2009-122540 filed on May 20, 2009 are incorporated as a reference.

While the invention has been explained with reference to the specific embodiments of the invention, the explanation is illustrative and the invention is limited only by the appended claims.

What is claimed is:

1. A power factor correction power supply unit for correcting a power factor of a boost converter, comprising:
   a switching device;
   an input voltage detection circuit for detecting a magnitude of an input voltage and outputting an input voltage detection signal;
   an output voltage detection circuit for detecting a magnitude of an output voltage and outputting an output voltage detection signal;
   an error amplifier for outputting an error signal obtained by amplifying a difference between the output voltage detection signal and a reference voltage;
   an ON width generation circuit for generating an ON time width of the switching device determined by multiplying a difference between the error signal and a predetermined bias voltage by a predetermined coefficient;
   an OFF width generation circuit for generating an OFF time width of the switching device determined by dividing a product of the input voltage detection signal, the difference between the error signal and the predetermined bias voltage, and the predetermined coefficient, with a difference between the output voltage detection signal and the input voltage detection signal; and
   a switching device driving circuit for conducting an ON/OFF control over the switching device upon receiving a turn-on timing signal for turning on the switching device as soon as the OFF time width of the switching device generated by the OFF width generation circuit is terminated and upon receiving a turn-off timing signal for turning off the switching device as soon as the ON time width of the switching device generated by the ON width generation circuit is terminated.

2. The power factor correction power supply unit according to claim 1, further comprising:
   a capacitor for generating the turn-on timing signal for turning on the switching device and the turn-off timing signal for turning off the switching device;
   a capacitor charging circuit for charging the capacitor from the predetermined bias voltage to the error signal with a predetermined charging current so as to determine the ON time width of the switching device; and
   a capacitor discharging circuit for discharging the capacitor from the error signal to the predetermined bias voltage with a predetermined discharging current so as to determine the OFF time width of the switching device.

3. The power factor correction power supply unit according to claim 2, wherein the capacitor charging circuit includes a constant current source for controlling the predetermined charging current, and a first switch circuit for applying the constant current source into a charging path of the capacitor,
   wherein the capacitor discharging circuit includes a current source for controlling the predetermined discharging current, and a second switch circuit for applying the current source into a discharging path of the capacitor, and wherein the predetermined charging current is set at a fixed value by the constant current source, and the current source controls a value of the predetermined discharging current such that the predetermined discharging current=the predetermined charging current×(the output voltage detection signal−the input voltage detection signal)/the input voltage detection signal.

4. The power factor correction power supply unit according to claim 2, wherein the predetermined coefficient is determined by a ratio between a capacitance value of the capacitor and the predetermined charging current used for charging the capacitor from the predetermined bias voltage to the error signal.

5. The power factor correction power supply unit according to claim 2, further comprising:
   a first comparison circuit for comparing an end-to-end voltage of the capacitor with the error signal; and
   a second comparison circuit for comparing the end-to-end voltage of the capacitor with the predetermined bias voltage,
   wherein the first comparison circuit outputs the turn-off timing signal as soon as the first comparison circuit detects that the end-to-end voltage of the capacitor has exceeded the error signal, and the second comparison circuit outputs the turn-on timing signal as soon as the second comparison circuit detects that the end-to-end voltage of the capacitor has dropped to the bias voltage or below.

6. The power factor correction power supply unit according to claim 5, further comprising a delay circuit provided to an output side of the second comparison circuit so as to delay, by a predetermined time, the turn-on timing signal outputted from the second comparison circuit, thereby delaying a turn-on timing.

7. The power factor correction power supply unit according to claim 1, further comprising:
   a capacitor for generating the turn-on timing signal for turning on the switching device and the turn-off timing signal for turning off the switching device;
   a capacitor discharging circuit for discharging the capacitor from the predetermined bias voltage to the error signal with a predetermined discharging current so as to determine the ON time width of the switching device; and
   a capacitor charging circuit for charging the capacitor from the error signal to the predetermined bias voltage with a predetermined charging current so as to determine the OFF time width of the switching device.

8. The power factor correction power supply unit according to claim 7, wherein the capacitor discharging circuit includes a constant current source for controlling the predetermined discharging current, and a first switch circuit for applying the constant current-source into a discharging path of the capacitor,
   wherein the capacitor charging circuit includes a current source for controlling the predetermined charging current, and a second switch circuit for applying the current source into a charging path of the capacitor, and
   wherein the predetermined discharging current is set to a fixed value by the constant current source, and the current source sets a value of the predetermined charging current such that the predetermined charging current=the predetermined discharging current×(the output voltage detection signal−the input voltage detection signal)/the input voltage detection signal.

9. The power factor correction power supply unit according to claim 7, wherein the predetermined coefficient is determined by a ratio between a capacitance value of the capacitor and the predetermined discharging current used for discharging the capacitor from the predetermined bias voltage to the error signal.

10. The power factor correction power supply unit according to claim 7, further comprising:
    a first comparison circuit for comparing an end-to-end voltage of the capacitor with the error signal; and
    a second comparison circuit for comparing the end-to-end voltage of the capacitor with the predetermined bias voltage,
    wherein the first comparison circuit outputs the turn-off timing signal as soon as the first comparison circuit detects that the end-to-end voltage of the capacitor has dropped to the error signal or below, and the second comparison circuit outputs the turn-on timing signal as soon as the second comparison circuit detects that the end-to-end voltage of the capacitor has exceeded the bias voltage.

11. The power factor correction power supply unit according to claim 10, further comprising a delay circuit provided to an output side of the second comparison circuit so as to delay, by a predetermined time, the turn-on timing signal outputted from the second comparison circuit, thereby delaying a turn-on timing.

12. A control circuit for use in a power factor correction power supply unit, said control circuit receiving an input voltage detection signal indicating magnitude of an input voltage to the power factor correction power supply unit, and an output voltage detection signal indicating magnitude of an output voltage of the power factor correction power supply unit, said control circuit comprising:
    an error amplifier for outputting an error signal obtained by amplifying a difference between the output voltage detection signal and a reference voltage;
    an ON width generation circuit for generating an ON time width of a switching device of the power factor correction power supply unit determined by multiplying a difference between the error signal and a predetermined bias voltage with a predetermined coefficient;
    an OFF width generation circuit for generating an OFF time width of the switching device determined by dividing a product of the input voltage detection signal, the difference between the error signal and the predetermined bias voltage, and the predetermined coefficient, with a difference between the output voltage detection signal and the input voltage detection signal; and
    a switching device driving circuit for conducting an ON/OFF control over the switching device upon receiving a turn-on timing signal for turning on the switching device as soon as the OFF time width of the switching device generated by the OFF width generation circuit is terminated, and upon receiving a turn-off timing signal for turning off the switching device as soon as the ON time width of the switching device generated by the ON width generation circuit is terminated.

13. The control circuit according to claim 12, further comprising a voltage detection circuit having two resistors connected in series between a to-be-detected voltage and a ground so as to obtain the to-be-detected voltage from a series connection point between the resistors when the input voltage detection signal or the output voltage detection signal is to be detected.

14. A control method for controlling ON/OFF time widths of a switching device to improve a power factor of a power factor correction power supply unit, comprising the steps of:

acquiring an input voltage detection signal and an output voltage detection signal as inputs, the input voltage detection signal indicating a magnitude of an input voltage to the power factor correction power supply unit and the output voltage detection signal indicating a magnitude of an output voltage of the power factor correction power supply unit;

outputting an error signal obtained by amplifying a difference between the output voltage detection signal and a reference voltage;

generating an ON time width of the switching device of the power factor correction power supply unit determined by multiplying a difference between the error signal and a predetermined bias voltage with a predetermined coefficient;

generating an OFF time width of the switching device determined by dividing a product of the input voltage detection signal, the difference between the error signal and the predetermined bias voltage, and the predetermined coefficient, with a difference between the output voltage detection signal and the input voltage detection signal; and conducting an ON/OFF control over the switching device upon receiving a turn-on timing signal for turning on the switching device as soon as the OFF time width of the switching device is terminated and upon receiving a turn-off timing signal for turning off the switching device as soon as the ON time width of the switching device is terminated.

* * * * *